US011295312B1

(12) United States Patent
Aabram et al.

(10) Patent No.: US 11,295,312 B1
(45) Date of Patent: *Apr. 5, 2022

(54) SYSTEM AND METHOD FOR ACCUMULATION AND MAINTENANCE OF MONEY IN A VEHICLE MAINTENANCE SAVINGS ACCOUNT

(71) Applicant: Allstate Insurance Company, Northbrook, IL (US)

(72) Inventors: Michael P. Aabram, Naperville, IL (US); Grady Irey, Des Plaines, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/241,160

(22) Filed: Apr. 27, 2021

Related U.S. Application Data

(63) Continuation of application No. 16/722,220, filed on Dec. 20, 2019, now Pat. No. 11,023,898, which is a
(Continued)

(51) Int. Cl.
*G06Q 30/00* (2012.01)
*G06Q 20/40* (2012.01)
*G06Q 40/08* (2012.01)

(52) U.S. Cl.
CPC ........ *G06Q 20/405* (2013.01); *G06Q 40/08* (2013.01)

(58) Field of Classification Search
CPC .................................................. G06F 19/00
(Continued)

(56) References Cited

U.S. PATENT DOCUMENTS 6,711,474 B1 * 3/2004 Treyz ................. G06Q 30/02
701/1
7,610,209 B2 10/2009 Stanton
(Continued)

FOREIGN PATENT DOCUMENTS

| WO | 2010095119 A1 | 8/2010 |
| WO | 2011128862 A2 | 10/2011 |
| WO | 2013134863 A1 | 9/2013 |

OTHER PUBLICATIONS

ProQuestNPL Search History.*
(Continued)

*Primary Examiner* — John H. Holly
(74) *Attorney, Agent, or Firm* — Polsinelli PC

(57) ABSTRACT

Systems and methods are provided for accumulating and maintaining funds (e.g., money, a money proxy or a combination thereof) in a vehicle maintenance savings account. The account funds may be used to pay for the costs of maintaining and/or operating a vehicle (e.g., costs of maintenance and operation associated with ownership, leasing or renting a vehicle) and/or driver safety. For instance, the balance of the account may be used to pay for driver's education, driver's safety courses, attention improvement/maintenance courses, visual acuity improvement/maintenance courses, vehicle maintenance, repair, inspections, registration, check-ups, replacement parts, emissions testing, government stickers, taxes, license plates, insurance premiums, insurance deductibles, safety products, sensors/monitors, disposal fees, new vehicles of a certain type, etc. The vehicle maintenance savings account system may collect and analyze user data, and may accumulate funds for the user when the user engages in certain user behaviors (e.g., safe driving behaviors, purchase behaviors, account use behaviors, etc.).

20 Claims, 12 Drawing Sheets

Related U.S. Application Data continuation of application No. 14/737,299, filed on Jun. 11, 2015, now Pat. No. 10,565,593.

(58) Field of Classification Search
USPC ....... 705/4, 1.1, 39, 35, 36 R, 42, 14.13, 44; 235/380, 379; 701/35, 210, 33
See application file for complete search history.

(56) References Cited

U.S. PATENT DOCUMENTS

| | | |
|---|---|---|
| 8,204,766 B2 | 6/2012 | Bush |
| 8,255,275 B2 | 8/2012 | Collopy et al. |
| 8,466,781 B2 | 6/2013 | Miller et al. |
| 8,498,937 B1 | 7/2013 | Shipman, Jr. et al. |
| 8,549,318 B2 | 10/2013 | White et al. |
| 8,577,703 B2 | 11/2013 | McClellan et al. |
| 8,712,909 B1 | 4/2014 | Raubenheimer et al. |
| 8,731,974 B2 | 5/2014 | Pandhi et al. |
| 8,788,298 B2 | 7/2014 | Nichols et al. |
| 2002/0002475 A1 | 1/2002 | Freedman et al. |
| 2002/0010613 A1 | 1/2002 | Lallo |
| 2002/0016655 A1* | 2/2002 | Joao ..................... G07C 5/085 701/33.4 |
| 2002/0128882 A1 | 9/2002 | Nakagawa et al. |
| 2005/0033694 A1 | 2/2005 | Perrin |
| 2008/0185835 A1 | 8/2008 | Bolongia |
| 2008/0243558 A1 | 10/2008 | Gupte |
| 2011/0040579 A1 | 2/2011 | Havens |
| 2011/0106370 A1 | 5/2011 | Duddle et al. |
| 2012/0041675 A1 | 2/2012 | Juliver et al. |
| 2012/0143952 A1 | 6/2012 | von Graf |
| 2012/0185282 A1 | 7/2012 | Gore et al. |
| 2013/0046593 A1 | 2/2013 | Kanel et al. |
| 2013/0085818 A1 | 4/2013 | Gore et al. |
| 2013/0164712 A1 | 6/2013 | Hunt et al. |
| 2013/0197973 A1 | 8/2013 | Liu et al. |
| 2013/0238439 A1 | 9/2013 | Chatterjee et al. |
| 2013/0316311 A1 | 11/2013 | England |
| 2013/0325541 A1 | 12/2013 | Capriotti et al. |
| 2013/0332004 A1 | 12/2013 | Gompert et al. |
| 2014/0032297 A1 | 1/2014 | Germann et al. |
| 2014/0195272 A1 | 7/2014 | Sadiq et al. |

OTHER PUBLICATIONS

Auto Insurance Coverage & Car Insurance Quotes Allstate, "When You're In The Car, We've Got You Covered", Retrived on Oct. 13, 2014, http://www.allstate.com/auto-insurance/auto-insurance-coverage-options.aspx.

Auto Insurance Texas—Texas Teen Driving Resources, Retrived on Oct. 13, 2014, http://www.texasinsuranceprovider.com/Auto_Insurance_Texas_Teen_Driver.html.

Better drivers pay less for car insurance with Snapshot Usage-Based Insurance program from Progressive, retrieved on Oct. 13, 2014, http://www.progressive.com/newsroom/article/2013/december/tennessee-snapshot-discount/.

Carrot Car Insurance, How it Works, retrieved Oct. 13, 2014, http://www.carrotinsurance.com/HowItWorks.aspx.

Drivescribe "Smart driving is now rewarding" Peace of mind included, Aug. 2012, retrieved from http://drivescribe.com/wp-content/uploads/2012/08/DriveScribePRessKit_for-web.pdf.

Strategies to sustain good driving behavior in the long-run: Part 3, fleetanswers.com, retrieved on Oct. 13, 2014, http://fleetanswers.com/content/strategies-sustain-good-driving-behavior-long-run-part-3.

Auto Insurance, Car Insurance Onlne, Liberty Mutual Insurance, Oct. 13, 2014, http://www.libertymutual.com/auto-insurance.

Progressive Car Insurance, "Better Drivers Pay Less for Car Insurance With Snapshot Usage-Based Insurance Program From Progressive," Oct. 13, 2014 http://www.progressive.com/newsroom/article/2013/december/tennessee-snapshot-discount.

Geico, "Protect Your Car With Mechanical Breakdown Insurance," Jun. 9, 2015, https://www.geico.com/getaquote/auto/mechanical-breakdown-insurance.

CarsDirect "Popular Auto Repair Insurance Companies," Jun. 9, 2015, http://www.carsdirect.com/car-insurance/3-most-popular-auto-repair-insurance-companies.

Leasecure Corporation, "Vehicle Management Solutions," Oct. 31, 2014, http://www.leasecure.com/Vehicle-Management.htm.

Unitrans Maintenance Plan, "Maintenance Plan," Oct. 31, 2014, http://www.uinsure.co.za/maintenance-plan.aspx.

Quarters, Cindy, et al., "How to Budget for Car Maintenance," http://budgeting.thenest.com/budget-car-maintenance-20519.html.

* cited by examiner

SYSTEM AND METHOD FOR ACCUMULATION AND MAINTENANCE OF MONEY IN A VEHICLE MAINTENANCE SAVINGS ACCOUNT

CROSS REFERENCE TO RELATED APPLICATIONS

This application is a continuation of and claims priority to co-pending U.S. application Ser. No. 16/722,220, filed Dec. 20, 2019, and entitled "System and Method for Accumulation and Maintenance of Money in a Vehicle Maintenance Savings Account," which is a continuation of and claims priority to U.S. application Ser. No. 14/737,299 (now U.S. Pat. No. 10,565,593), filed Jun. 11, 2015, and entitled "System and Method for Accumulation and Maintenance of Money in a Vehicle Maintenance Savings Account," which is incorporated herein by reference in its entirety.

BACKGROUND

Vehicle maintenance and repair can be extremely expensive. Often, drivers forego costly, but necessary, maintenance and repairs due to lack of funds. By doing such, the drivers expose others to the risks associated with poorly maintained, unsafe vehicles.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects of the present disclosure are directed toward methods, computer-readable media, software, systems and apparatuses that provide a vehicle maintenance savings account system for accumulation and maintenance of funds (e.g., money, a money proxy or a combination thereof), safe driving points and/or rewards that may be used to pay for the costs of maintaining and/or operating a vehicle (e.g., costs of maintenance and operation associated with ownership, leasing or renting a vehicle) and/or driver safety. For instance, a balance of the account may be used to pay for driver's education, driver's safety courses, attention improvement/maintenance courses, visual acuity improvement/maintenance courses, vehicle maintenance, repair, inspections, registration, check-ups, replacement parts, emissions testing, government stickers, taxes, license plates, insurance premiums, insurance deductibles, safety products, sensors/monitors, disposal fees, new vehicles of a certain type, etc. The vehicle maintenance savings account system may collect and analyze user data, and may accumulate funds for the user when the user engages in certain user behaviors (e.g., safe driving behaviors, purchase behaviors, account use behaviors, etc.). The vehicle maintenance savings account system may allow the user to both spend and transfer the vehicle maintenance savings account balance to other individuals. Subject to any applicable regulations, users may be provided rebates and/or account funds for engaging in certain user behaviors. The user may be an insurance customer or non-insurance customer, driver or non-driver.

The balance of the vehicle maintenance savings account may be increased via various avenues. According to certain aspects, a user may pre-designate a monthly and/or periodic amount that will be withdrawn from a bank account of the user (e.g., checking and/or savings account, money market account, etc.) and placed into the vehicle maintenance savings account. In some aspects, such monthly and/or periodic amount is paid simultaneously with an insurance premium payment and placed into the vehicle maintenance savings account. Additionally or alternatively, a user may elect to have a portion of a pay check or other regular deposit directed to the vehicle maintenance savings account.

In addition or in the alternative to user designations, the account balance may grow or increase via employer designations, insurance company designations, family/friend designations, and/or transfers from another user's vehicle maintenance savings account. In certain embodiments, the account manager designates funds to the vehicle maintenance savings account based on certain user behavior (e.g., the user's use of safety programs, use of particular authorized, certified or preferred services, shops or providers, referral of friends/family, use of social media to recommend the vehicle maintenance savings account program, safe driving, accumulation of good driver rewards checks, use of safe driver/vehicle data mobile applications, purchase of particular insurance products, use of particular insurance programs/services, purchase of particular safety products, purchase of fuel at a particular station, participation in a rewards program of a particular fuel/oil station/company, carpooling, being a passenger (e.g., not driving), using public transportation, renewing insurance, using the vehicle maintenance savings account during a particular time period, joining a vehicle maintenance savings account funds pool, adding additional vehicles to the account, providing information regarding vehicle repair or maintenance even when a warranty covers the cost, participating in a program that allows for provider/service recommendations to be provided to the user, maintaining/meeting a regular schedule of maintenance, driving a certain number of miles, purchasing another type of insurance policy, using a program or mobile application to book vehicle repair and maintenance appointments, being claim free and accident free for a particular period of time, etc.).

In certain aspects, the balance of the vehicle maintenance savings account includes pre-tax funds. In other aspects, the balance of the account may be used to pay for tax-deductible costs of meeting certain safety and environmental standards.

According to various aspects, the account balance may accumulate interest. In certain aspects, the account balance may accumulate interest at a guaranteed interest rate above a prime interest rate (e.g., 3%, 5%, 7%, 10%, 15%, 20%, 25%, etc.). The account balance, including interest earned, may roll over annually.

The vehicle maintenance savings account may be managed by an insurance company or an external non-insurance hosting entity (e.g., a bank, original equipment manufacturer (OEM), car dealership, etc.). In certain aspects, the account may achieve a negative balance, essentially allowing the manager of the account or entity hosting or facilitating the account to provide a loan to the user for costs of maintaining and/or operating a vehicle (e.g., costs of maintenance and operation associated with ownership, leasing or renting a vehicle) and driver safety. In some instances, the user may cash-out all funds personally designated and interest on such, but the manager of the account may retain all other funds if unused. In other aspects, the user may cash-out all monetary funds and interest on such, but the manager of the account may retain all non-monetary funds (e.g., money proxy). According to certain embodiments, the manager of the account is an insurance company, the user does not have an insurance policy with the insurance company, and the insurance company processes payments to the insurance company of the user using the vehicle maintenance savings account of the user.

Vehicle maintenance and safe driving behaviors may be encouraged via various benefits associated with the vehicle maintenance savings account. In some embodiments, the user may receive a discount on safety programs, maintenance, repairs, particular insurance products, certain insurance programs/services, particular safety products, fuel at a particular station, or the like if the vehicle maintenance savings account is used to pay for such. In other aspects, funds and/or a rebate may be deposited into the vehicle maintenance savings account based on certain user behaviors. In certain embodiments, if the account is used to pay for preferred, certified or approved products or services, the funds and/or rebate may be multiplied (multiplied funds may be considered, for example, "Superdollars") before being deposited into the account.

The manager of the vehicle maintenance savings account may use the account and the user's use of such to gather data. For instance, an insurance company may use information gained from a user's particular use of the account to determine insurance rating factors, calculate driver scores, set insurance premiums, and the like.

The details of these and other aspects of the disclosure are set forth in the accompanying drawings and description below. Other features and advantages of aspects of the disclosure will be apparent from the description and drawings.

BRIEF DESCRIPTION OF THE DRAWINGS

Some embodiments are illustrated by way of example, and not by way of limitation, in the figures of the accompanying drawings. Aspects of the disclosure may be implemented in certain parts, steps, and embodiments that will be described in detail in the following description and illustrated in the accompanying drawings in which like reference numerals indicate similar elements. It will be appreciated with the benefit of this disclosure that the steps illustrated in the accompanying figures may be performed in other than the recited order and that one or more of the steps may be optional. It will also be appreciated with the benefit of this disclosure that one or more components illustrated in the accompanying figures may be positioned in other than the disclosed arrangement and that one or more of the components illustrated may be optional.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof, as well as additional items and equivalents thereof. As used in this description, a set refers to a collection of one or more elements. A user, as used in this description, refers to an individual, group of individuals, or a vehicle. In certain embodiments, a family, group of friends or co-workers, or other group that shares one or more vehicles may have a single vehicle maintenance savings account that is shared by the group. In one or more variations, a vehicle may have an associated vehicle maintenance savings account that is based on one or more primary drivers of the vehicle and can be affected by the behavior (e.g., safe driving behavior, purchase behavior, account use behavior, etc.) of any of the vehicle's drivers. In other embodiments, a vehicle may be configured to identify different drivers, and each driver of the vehicle may have a separate vehicle maintenance savings account. The user may or may not hold a fully qualified driver's license, may or may not own/lease/rent a vehicle, and may or may not hold an insurance policy.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 12:
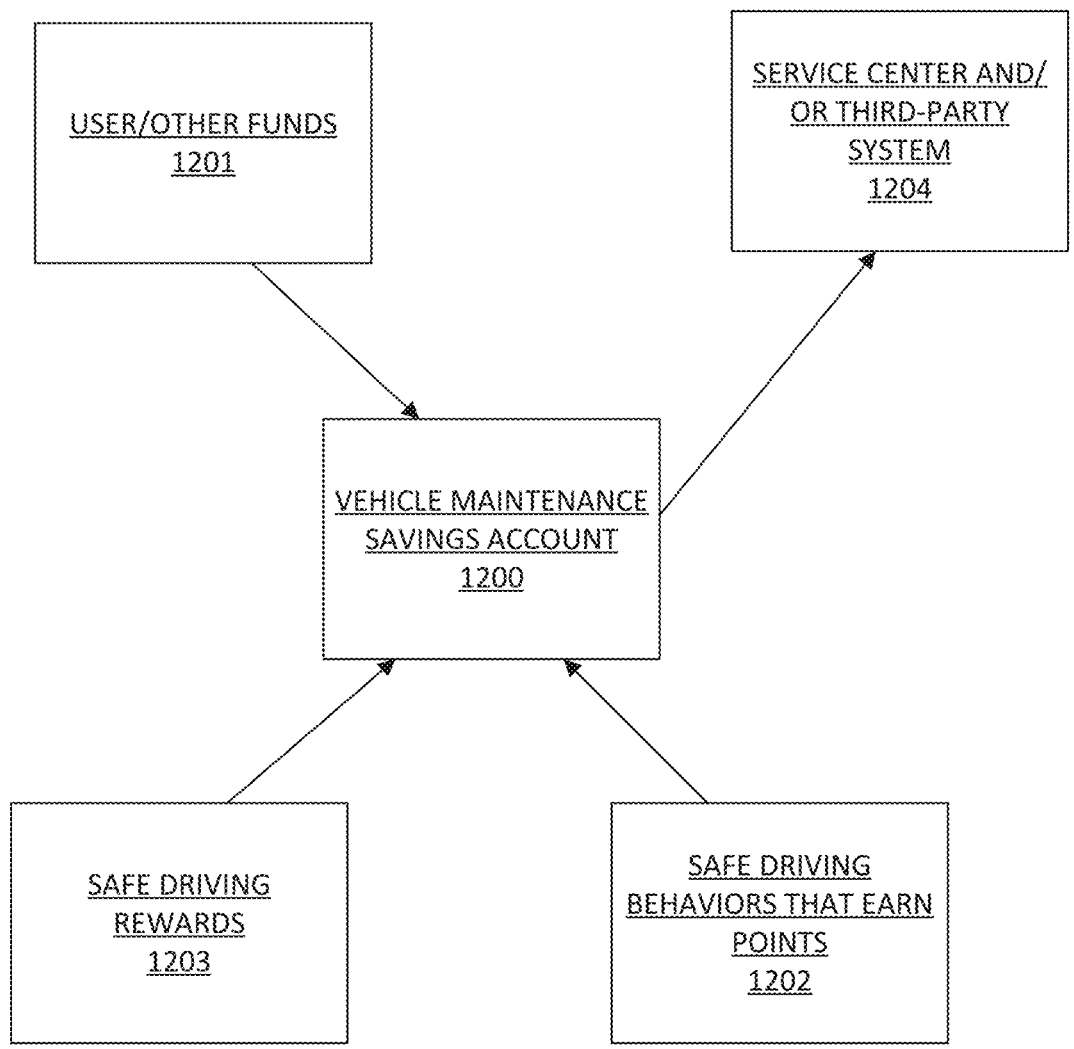
FIG. 12 is a block diagram illustrating various components associated with an example vehicle maintenance savings account, according to one or more aspects of the disclosure.

Aspects of the present disclosure are directed toward methods, computer-readable media, software, systems and apparatuses that provide a vehicle maintenance savings account system for accumulation and maintenance of funds (e.g., money, a money proxy or a combination thereof), safe driving points and/or rewards that may be used to pay for the costs of maintaining and/or operating a vehicle (e.g., costs of maintenance and operation associated with ownership, leasing or renting a vehicle) and/or driver safety. FIG. 12 is a block diagram illustrating various components associated with an example vehicle maintenance savings account (block 1200), according to one or more aspects of the disclosure.

The balance of the vehicle maintenance savings account may be increased via various avenues. According to certain aspects, a user may pre-designate a monthly and/or periodic amount that will be withdrawn from a bank account of the user (e.g., checking and/or savings account, money market account, etc.) and placed into the vehicle maintenance savings account (block 1201). In some aspects, such monthly and/or periodic amount is paid simultaneously with an insurance premium payment and placed into the vehicle maintenance savings account. Additionally or alternatively, a user may elect to have a portion of a pay check or other regular deposit directed to the vehicle maintenance savings account.

In addition or in the alternative to user designations, the account balance may grow or increase via employer designations, insurance company designations, family/friend designations, and/or transfers from another user's vehicle maintenance savings account (block 1201). In certain embodiments, the account manager designates funds to the vehicle maintenance savings account based on certain user behavior (e.g., the user's use of safety programs, use of particular authorized, certified or preferred services, shops or providers, referral of friends/family, use of social media to recommend the vehicle maintenance savings account program, safe driving, accumulation of good driver rewards checks, use of safe driver/vehicle data mobile applications, purchase of particular insurance products, use of particular insurance programs/services, purchase of particular safety products, purchase of fuel at a particular station, participation in a rewards program of a particular fuel/oil station/company, carpooling, being a passenger (e.g., not driving), using public transportation, renewing insurance, using the vehicle maintenance savings account during a particular time period, joining a vehicle maintenance savings account funds pool, adding additional vehicles to the account, providing information regarding vehicle repair or maintenance even when a warranty covers the cost, participating in a program that allows for provider/service recommendations to be provided to the user, maintaining/meeting a regular schedule of maintenance, driving a certain number of miles, purchasing another type of insurance policy, using a program or mobile application to book vehicle repair and maintenance appointments, being claim free and accident free for a particular period of time, etc.). In some embodiments, telematics data showing safe driving behaviors may earn safe driving points as discussed herein, and the safe driving points may be deposited in the vehicle maintenance savings account (such that the account maintains funds, safe driving points or a combination thereof) or may be converted to funds (block 1202). Conversion of safe driving points to funds may include, for example, providing a user a certain amount of funds for a particular amount or range of safe driving points (e.g., $5 for 500 safe driving points, $5 for 100-500 safe driving points, $0.01 for every safe driving point, etc). In certain aspects, the safe driving points may earn safe driving rewards. Such rewards may be directly deposited into the account or converted to funds and deposited into the account (block 1203).

In certain aspects, the balance of the vehicle maintenance savings account includes pre-tax funds. In other aspects, the balance of the account may be used to pay for tax-deductible costs of meeting certain safety and environmental standards.

According to various aspects, the account balance may accumulate interest. In certain aspects, the account balance may accumulate interest at a guaranteed interest rate above a prime interest rate (e.g., 3%, 5%, 7%, 10%, 15%, 20%, 25%, etc.). The account balance, including interest earned, may roll over annually.

The vehicle maintenance savings account may be managed by an insurance company or an external non-insurance hosting entity (e.g., a bank, original equipment manufacturer (OEM), car dealership, etc.). In certain aspects, the account may achieve a negative balance, essentially allowing the manager of the account or entity hosting or facilitating the account to provide a loan to the user for costs of maintaining and/or operating a vehicle (e.g., costs of maintenance and operation associated with ownership, leasing or renting a vehicle) and driver safety. In some instances, the user may cash-out all funds personally designated and interest on such, but the manager of the account may retain all other funds if unused. In other aspects, the user may cash-out all monetary funds and interest on such, but the manager of the account may retain all non-monetary funds (e.g., money proxy). According to certain embodiments, the manager of the account is an insurance company, the user does not have an insurance policy with the insurance company, and the insurance company processes payments to the insurance company of the user using the vehicle maintenance savings account of the user.

A balance of the account may be, for instance, used to pay for driver's education, driver's safety courses, attention improvement/maintenance courses, visual acuity improvement/maintenance courses, vehicle maintenance, repair, inspections, registration, check-ups, replacement parts, emissions testing, government stickers, taxes, license plates, insurance premiums, insurance deductibles, safety products, sensors/monitors, disposal fees, new vehicles of a certain type, etc. (block 1204). The vehicle maintenance savings account system may collect and analyze user data, and may accumulate funds for the user when the user engages in certain user behaviors (e.g., safe driving behaviors, purchase behaviors, account use behaviors, etc.). The vehicle maintenance savings account system may allow the user to both spend and transfer the vehicle maintenance savings account balance to other individuals. Subject to any applicable regulations, users may be provided rebates and/or account funds for engaging in certain user behaviors. The user may be an insurance customer or non-insurance customer, driver or non-driver.

Vehicle maintenance and safe driving behaviors may be encouraged via various benefits associated with the vehicle maintenance savings account. In some embodiments, the user may receive a discount on safety programs, maintenance, repairs, particular insurance products, certain insurance programs/services, particular safety products, fuel at a particular station, or the like if the vehicle maintenance savings account is used to pay for such. In other aspects, funds and/or a rebate may be deposited into the vehicle maintenance savings account based on certain user behaviors. In certain embodiments, if the account is used to pay for preferred, certified or approved products or services, the funds and/or rebate may be multiplied (e.g., multiplied funds may be considered "Superdollars") before being deposited into the account.

The manager of the vehicle maintenance savings account may use the account and the user's use of such to gather data. For instance, an insurance company may use information gained from a user's particular use of the account to determine insurance rating factors, calculate driver scores, set insurance premiums, and the like.

Figure 1:
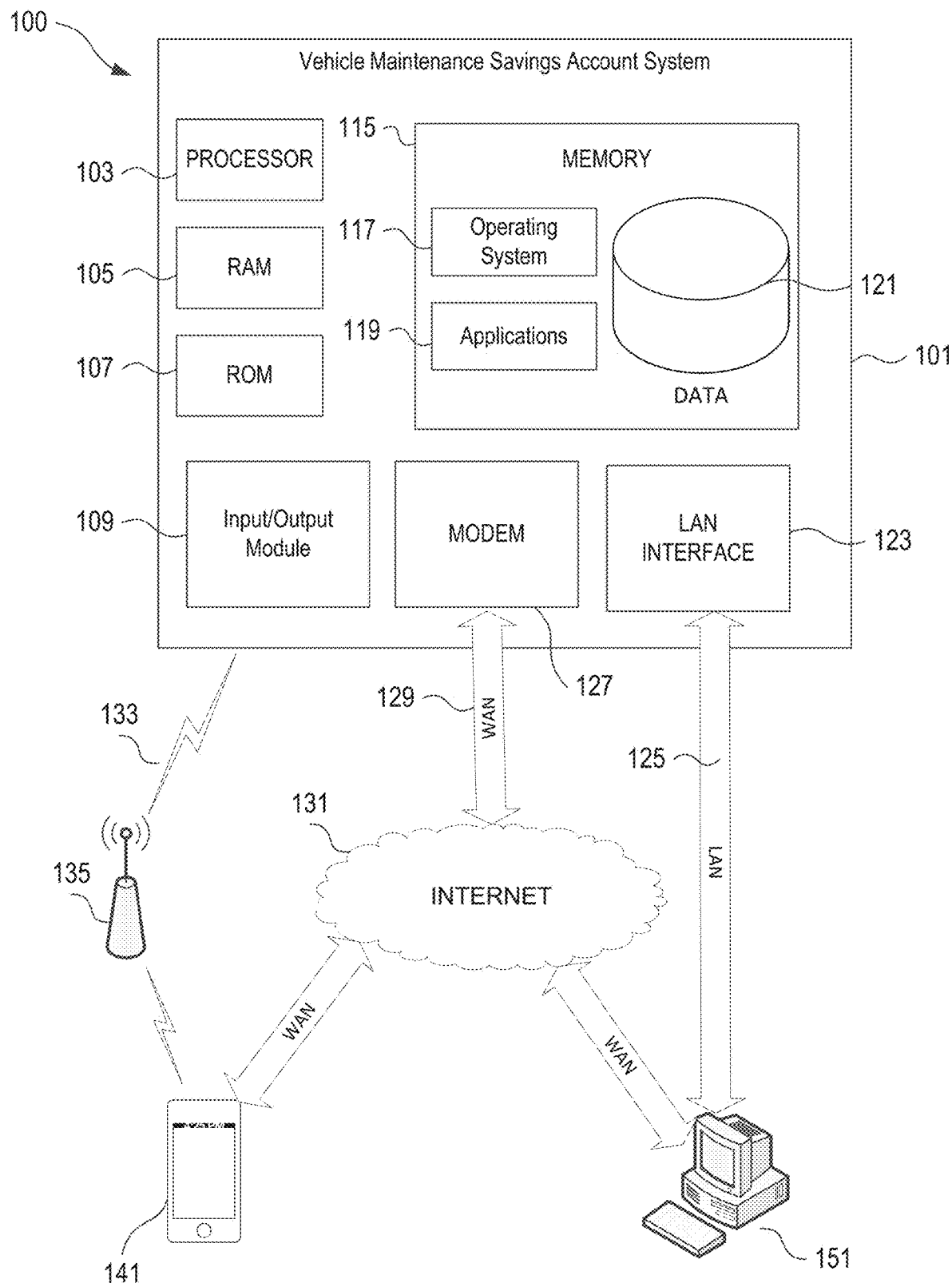
FIG. 1 illustrates a network environment in which a vehicle maintenance savings account system may be implemented according to one or more aspects of the disclosure.

FIG. 1 illustrates a block diagram of a vehicle maintenance savings account system 101 in a vehicle maintenance savings account acquisition system 100 that may be used according to one or more illustrative embodiments of the disclosure. The vehicle maintenance savings account system 101 may have a processor 103 for controlling overall operation of the vehicle maintenance savings account system 101 and its associated components, including RAM 105, ROM 107, input/output unit 109, and memory 115. The vehicle maintenance savings account system 101, along with one or more additional devices (e.g., terminals 141, 151) may correspond to one or more special-purpose computing devices, such as vehicle maintenance savings account computing devices or systems, configured as described herein for collecting and analyzing user data, allowing a user to set aside funds for costs associated with maintaining and/or operating a vehicle (e.g., costs of maintenance and operation associated with ownership, leasing or renting a vehicle) and driver safety, providing a user with funds for engaging in certain user behaviors (e.g., safe driving behaviors, purchase behaviors, account use behaviors, etc.), multiplying funds (e.g., gaining Superdollars) for particularly preferred behaviors, allowing the user to spend the designated funds, and allowing the user to transfer the funds to other users. User data may be used to determine whether the account manager designates funds to the account or multiplies funds already in the account (e.g., gains Superdollars). In certain embodiments, user data may be vehicle telematics data including data received from one or more telematics devices, vehicle sensors, or vehicle subsystems and then transmitted to a system or device located remotely relative to the vehicle. Additionally or alternatively, user data may be user purchase data including data received from one or more vehicle service devices or subsystems, third-party devices or subsystems, and/or other devices or subsystems associated with vehicle possession, operation and maintenance, and then, optionally, transmitted to a system or device located remotely relative to the transmitting device(s) or subsystem(s). Additionally or alternatively, user data may be account use data including data received from one or more vehicle maintenance savings account devices or subsystems, vehicle service devices or subsystems, third-party devices or subsystems, social media devices or subsystems, and/or other devices or subsystems associated with vehicle possession, operation and maintenance and then, optionally, transmitted to a system or device located remotely relative to the transmitting device(s) or subsystem(s); etc.). User data (e.g., vehicle telematics data, user purchase data, account use data, etc.) may also include data received from a mobile computing device (e.g., mobile phone, portable computing device, or the like) or a third-party system (e.g., a third party telematics system).

Input/Output (I/O) module 109 may include devices such as a microphone, keypad, touch screen, stylus or combination thereof through which a user of the vehicle maintenance savings account system 101 may provide input, and may also include one or more of a speaker for providing audio output and a video display device for providing textual, audiovisual and/or graphical output. Software may be stored within memory 115 and/or storage to provide instructions to processor 103 for enabling vehicle maintenance savings account system 101 to perform various functions. For example, memory 115 may store software used by the vehicle maintenance savings account system 101, such as an operating system 117, application programs 119, and an associated internal database 121. Processor 103 and its associated special-purpose computing devices may allow the vehicle maintenance savings account acquisition system 100 to execute a series of computer-readable instructions to collect and analyze user data, allow a user to set aside funds for costs associated with maintaining and/or operating a vehicle (e.g., costs of maintenance and operation associated with ownership, leasing or renting a vehicle) and driver safety, provide a user with funds for engaging in certain user behaviors (e.g., safe driving behaviors, purchase behaviors, account use behaviors, etc.), multiply funds (e.g., gain Superdollars) for particularly preferred behaviors, allow the user to spend the designated funds, and allow the user to transfer the funds to other users.

The vehicle maintenance savings account system 101 may operate in a networked environment (e.g., vehicle maintenance savings account acquisition system 100) supporting connections to one or more remote computers, such as terminals/devices 141 and 151. The vehicle maintenance savings account system 101, and related terminals/devices 141 and 151, may be in signal communication with special-purpose devices installed in vehicles, special-purpose mobile special-purpose computing devices that may travel within vehicles, or special-purpose devices outside of vehicles that may be configured to receive and process vehicle telematics data. Thus, terminals/devices 141 and 151 may each include personal computers (e.g., laptop, desktop, tablet computer or the like), servers (e.g., web servers, database servers, etc.), vehicle-based devices (e.g., on-board vehicle computers, short-range vehicle communication systems, telematics devices or the like), or mobile communication devices (e.g., mobile phones, portable computing devices, or the like), and may include some or all of the elements described above with respect to the vehicle maintenance savings account system 101.

The network connections depicted in FIG. 1 include a local area network (LAN) 125 and a wide area network (WAN) 129, and a wireless telecommunications network 133, but may also include other networks. When used in a LAN networking environment, the vehicle maintenance savings account system 101 may be connected to the LAN 125 through a network interface or adapter 123. When used in a WAN networking environment, the vehicle maintenance savings account system 101 may include a modem 127 or other means for establishing communications over the WAN 129, such as network 131 (e.g., the Internet). When used in a wireless telecommunications network 133, the vehicle maintenance savings account system 101 may include one or more transceivers, digital signal processors, and additional circuitry and software for communicating with wireless computing devices 141 (e.g., mobile phones, short-range vehicle communication systems, vehicle telematics devices, etc.) via one or more network devices 135 (e.g., base transceiver stations) in the wireless network 133.

It will be appreciated that the network connections shown are illustrative and other means of establishing a communications link between the computers (e.g., terminals/devices 141 and 151) may be used. The existence of any of various network protocols such as TCP/IP, Ethernet, FTP, HTTP and the like, and of various wireless communication technologies such as GSM, CDMA, WiFi, and WiMAX, is presumed, and the various computing devices described herein may be configured to communicate using any of these network protocols or technologies.

Additionally, one or more application programs 119 used by the vehicle maintenance savings account system 101 may include computer executable instructions (e.g., instructions for vehicle telematics data collection and analysis programs, safe driving points calculation programs, account funds calculation programs, reward issuing programs, account funds allocation and accumulation programs, account funds maintenance programs, reward redemption programs, account funds redemption programs, account funds transfer programs, and the like) for collecting and analyzing vehicle telematics data associated with a vehicle, providing safe driving points and/or account funds to a user, issuing rewards based on the safe driving points, allocating and accumulating account funds based on a user engaging in certain user behaviors (e.g., safe driving behaviors, purchase behaviors, account use behaviors, etc.), maintaining account funds, allowing the user to redeem the rewards and/or account funds, and allowing the user to transfer the safe driving points and/or account funds to another user.

Figure 2:
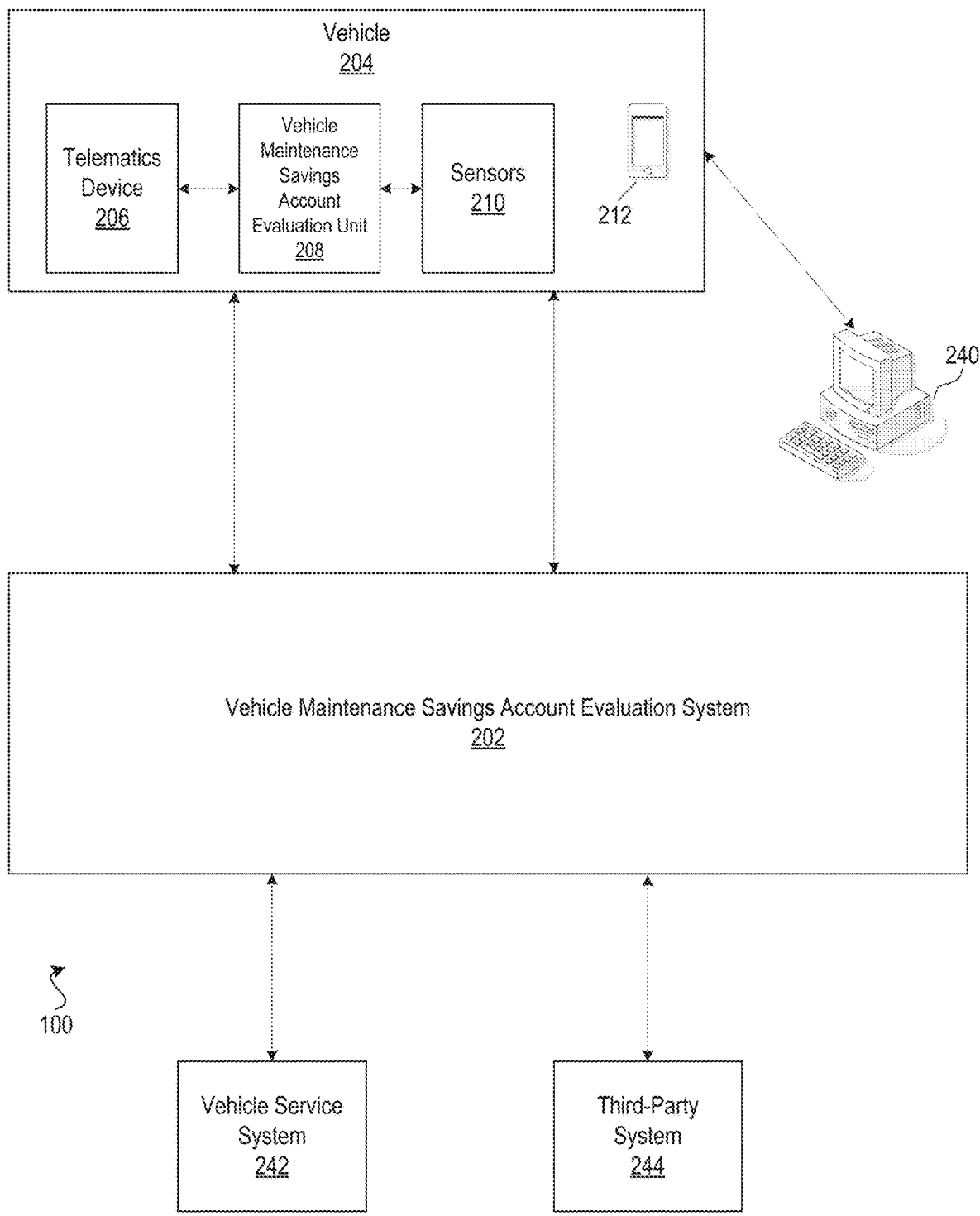
FIG. 2 is a block diagram illustrating various components and devices associated with an example vehicle maintenance savings account acquisition system, according to one or more aspects of the disclosure.

FIG. 2 is an illustration of an example implementation of a vehicle maintenance savings account acquisition system 100. The system 100, in this example, includes a vehicle maintenance savings account evaluation system 202. The vehicle maintenance savings account evaluation system 202, described in further detail below, provides funds to a vehicle maintenance savings account based on a user engaging in certain user behaviors (e.g., safe driving behaviors, purchase behaviors, account use behaviors, etc.). In certain embodiments, the vehicle maintenance savings account evaluation system 202 determines whether a user has engaged in safe driving behaviors based on vehicle telematics data. Vehicle telematics data, as used in this description, refers to data received from sensors 210 and/or a telematics device 206 that provide an indication of how a user (e.g., driver) operates a vehicle with respect to, for example, accelerating, decelerating, braking, turning, signaling, lane usage, adequate vehicle spacing, speed, distraction management, and other driving-related operations performed by the user. A vehicle telematics device may be installed at, attached to, or in signal communication with a vehicle or various systems or components of the vehicle.

The vehicle maintenance savings account evaluation system 202 may contain some or all of the hardware/software components of the vehicle maintenance savings account system 101 depicted in FIG. 1. The vehicle maintenance savings account evaluation system 202 is a special-purpose computing device that is configured to receive vehicle driving data from one or more vehicles 204, such that information may be received (i) from telematics devices installed at and/or attached to the vehicle, (ii) from telematics devices located in the vehicle during its operation (e.g., at a mobile special-purpose computing device), or (iii) from special-purpose computing devices located remotely relative to the vehicle that receive the vehicle telematics data "from the vehicle" as described in (i) or (ii). The vehicle maintenance savings account evaluation system 202 is also configured to send and receive data to and from a vehicle service system 242 (e.g., gas station and/or pump system, a towing facility and/or vehicle system, auto repair/maintenance shop system, auto dealership system, vehicle service department system, vehicle inspection system, vehicle emissions testing system, roadside assistance system, vehicle parts supplier/retailer system, vehicle safety product supplier/retailer system, vehicle sensor/monitor supplier/retailer system, etc.), a third-party system 244 (e.g., an insurance system, a fleet management system, a cash-register system, a banking system, a social media system, a driver's education system, a Department of Motor Vehicle (DMV) system, a government system, a driver's safety course system, an attention improvement/maintenance course system, a visual acuity improvement/maintenance course system, etc.), and other systems associated with vehicle possession, operation and maintenance.

The vehicle maintenance savings account evaluation system 202 may initiate communication with or retrieve driving data from a vehicle 204 wirelessly via one or more telematics devices 206, or by way of separate computing systems (e.g., computer 240) over one or more computer networks (e.g., the Internet). The vehicle maintenance savings account evaluation system 202 may also be configured to receive telematics data from one or more third-party telematics systems. Additionally, the vehicle maintenance savings account evaluation system 202 may receive additional data relevant to safe driving behaviors from other non-vehicle data sources, such as external traffic databases containing traffic data (e.g., amounts of traffic, average driving speed, traffic speed distribution, and numbers and types of accidents, etc.) at various times and locations, external weather databases containing weather data (e.g., rain, snow, sleet and hail amounts, temperatures, wind, road conditions, visibility, etc.) at various times and locations, and other external data sources containing driving hazard data (e.g., road hazards, traffic accidents, downed trees, power outages, construction zones, school zones, and natural disasters, etc.).

In some examples, the vehicle maintenance savings account evaluation system 202 may acquire information about a vehicle directly from the vehicle 204, where the vehicle telematics data may be generated at the vehicle 204 itself. The vehicle 204 may be, for example, an automobile, motorcycle, scooter, bus, recreational vehicle, boat, airplane, bicycle, or other vehicle for which vehicle telematics data may be collected and analyzed, and for which an associated user may be provided vehicle maintenance savings account funds. The vehicle 204 may include one or more sensors 210, which are capable of detecting and recording various conditions at the vehicle and operating parameters of the vehicle. For example, the sensors 210 may detect, transmit, or store data corresponding to the vehicle's location (e.g., Global Positioning System (GPS) coordinates), speed and direction, rates of acceleration, deceleration, or braking, and specific instances of sudden acceleration, braking, and swerving. The sensors 210 may also detect, transmit, or store data received from the vehicle's internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, maintenance performed on the vehicle, and other data collected by the vehicle's computer systems.

Additional sensors 210 may detect and store the external driving conditions, for example, external temperature, rain, snow, light levels, and sun position for driver visibility. Additional sensors 210 may also detect and store data relating to compliance with traffic laws and the observance of traffic signals and signs. Additional sensors 210 may further detect and store data relating to the maintenance of the vehicle 204, such as the engine status, oil level, engine coolant temperature, odometer reading, the level of fuel in the fuel tank, engine revolutions per minute (RPMs), tire pressure, or combinations thereof.

The vehicle may also include cameras or proximity sensors 210 capable of recording additional conditions inside or outside of the vehicle 204. For example, internal cameras 210 may detect conditions such as the number of passengers, the identity of the driver and/or passengers, and the types of passengers (e.g., adults, children, teenagers, handicapped, etc.) in the vehicle, and potential sources of driver distraction within the vehicle (e.g., pets, phone usage, unsecured objects in the vehicle, etc.). Sensors 210 also may be configured to collect data regarding a driver's movements or the condition of a driver. For example, the vehicle 204 may include sensors 210 that monitor a driver's movements, such as the driver's eye position and/or head position, etc. Additional sensors 210 may collect data regarding the physical and/or mental state of the driver, such as fatigue, distress or intoxication. The condition of the driver may be determined through the movements of the driver or through other sensors, for example, sensors that detect the content of alcohol in the air or blood alcohol content of the driver (e.g., a breathalyzer). Further, the vehicle 204 may include sensors 210 that are capable of detecting other nearby vehicles, traffic levels, road conditions, traffic obstructions, animals, cyclists, pedestrians, and other conditions that may factor into an analysis of vehicle telematics data. Certain vehicle sensors 210 also may collect information regarding the driver's route choice, whether the driver follows a given route, and to classify the type of trip (e.g., commute, errand, new route, etc.). A GPS, locational sensors positioned inside the vehicle, and/or locational sensors or devices external to the vehicle 204 may be used determine the route, trip type (e.g., commute, errand, new route, etc.), lane position, and other vehicle position or location data.

The data collected by the vehicle sensors 210 may be stored or analyzed within the respective vehicle 204, or may be transmitted to one or more external devices. For example, as shown in FIG. 2, sensor data may be transmitted to a vehicle maintenance savings account evaluation unit 208, which may be a collection of special-purpose computing devices that are interconnected and in signal communication with each other. The special-purpose computing devices may be programmed with a particular set of instructions that, when executed, perform functions associated with using vehicle telematics data to reward drivers for engaging in safe driving behaviors. As such, a vehicle maintenance savings account evaluation unit 208 may be a separate special-purpose computing device or may be integrated into one or more components within the vehicle 204, such as the telematics device 206, or in the internal computing systems of the vehicle 204. Additionally, the sensor data may be transmitted as vehicle telematics data via a telematics device 206 to one or more remote computing devices, such as a vehicle maintenance savings account evaluation system 202. A telematics device 206 may be a computing device containing many or all of the hardware/software components of the vehicle maintenance savings account system 101 depicted in FIG. 1. As discussed above, the telematics device 206 may receive vehicle telematics data from vehicle sensors 210, and may transmit the data to one or more external computer systems (e.g., an evaluation system of an insurance company, financial institution, or other entity) over a wireless transmission network. Telematics devices 206 also may be configured to detect or determine additional types of data relating to real-time driving and the condition of the vehicle 204. In certain embodiments, the telematics device 206 may contain or may be integral with one or more of the vehicle sensors 210. The telematics device 206 also may store the type of its respective vehicle 204, for example, the make, model, trim (or sub-model), year, and/or engine specifications, as well as other information such as vehicle owner or driver information, insurance information, and financing information for the vehicle 204.

In the example shown in FIG. 2, the telematics device 206 may receive vehicle telematics data from vehicle sensors 210, and may transmit the data to a vehicle maintenance savings account evaluation system 202. However, in other examples, one or more of the vehicle sensors 210 may be configured to transmit data directly to a vehicle maintenance savings account evaluation system 202 without using a telematics device 206. For instance, a telematics device 206 may be configured to receive and transmit data from certain vehicle sensors 210, while other sensors may be configured to directly transmit data to a vehicle maintenance savings account evaluation system 202 without using the telematics device 206. Thus, telematics device 206 may be optional in certain embodiments.

In certain embodiments, a mobile special-purpose computing device 212 within the vehicle 204 may be programmed with instructions to collect vehicle telematics data from telematics device 206 and/or from sensors 210, and then to transmit the vehicle telematics data to the vehicle maintenance savings account evaluation system 202 and/or other external computing devices. The mobile special-purpose computing device 212 may include an accelerometer, a GPS unit, and/or a telecommunication unit. Software applications executing on the mobile special-purpose computing device 212 may be configured to detect vehicle telematics data independently and/or may communicate with vehicle sensors 210 to receive additional vehicle telematics data. For example, a mobile special-purpose computing device 212 equipped with an accelerometer and/or a GPS unit may determine vehicle location, speed, direction and other basic vehicle telematics data without needing to communicate with the vehicle sensors 210, or any vehicle system. In other examples, software on the mobile special-purpose computing device 212 may be configured to receive some or all of the vehicle telematics data collected by vehicle sensors 210 and/or telematics device 206. In yet other examples, software on the mobile special-purpose computing device 212 may be configured to receive some or all of the vehicle telematics data from third-party telematics systems.

When the mobile special-purpose computing device 212 within the vehicle 204 is used to detect vehicle telematics data or to receive vehicle telematics data from the vehicle 204, the mobile special-purpose computing device 212 may store, analyze, or transmit the vehicle telematics data to one or more other devices. For example, the mobile special-purpose computing device 212 may transmit vehicle telematics data directly to a vehicle maintenance savings account evaluation system 202, and thus may be used in conjunction with or instead of the telematics device 206. Moreover, the processing components of the mobile special-purpose computing device 212 may be used to collect and analyze vehicle telematics data for safe driving behaviors, provide safe driving points and/or account funds to a user for engaging in certain user behaviors (e.g., safe driving behaviors, purchase behaviors, account use behaviors, etc.), issue rewards and/or account funds based on the safe driving points, allow the user to monitor and maintain issued rewards and/or account funds, allow the user to redeem and/or transfer the rewards, allow the user to spend and/or transfer the account funds, and perform other related functions. Therefore, in certain embodiments, the mobile special-purpose computing device 212 may be used in conjunction with, or in place of, the vehicle maintenance savings account evaluation unit 208.

The vehicle 204 may include a vehicle maintenance savings account evaluation unit 208, which may be a separate computing device or may be integrated into one or more other components within the vehicle 204, such as the telematics device 206, the internal computing systems of the vehicle 204, or the mobile special-purpose computing device 212. As discussed above, the vehicle maintenance savings account evaluation unit 208 also may be implemented by computing devices independent from the vehicle 204, such as one or more separate computer systems 240 (e.g., a user's home or office computer, an insurance company computer, or a computer of some other entity). In any of these examples, the vehicle maintenance savings account evaluation unit 208 may contain some or all of the hardware/software components of the vehicle maintenance savings account system 101 depicted in FIG. 1. Further, in certain implementations, the functionality of the vehicle maintenance savings account evaluation unit 208, such as collecting and analyzing vehicle telematics data for safe driving behaviors, providing safe driving points and/or account funds to a user for engaging in certain user behaviors (e.g., safe driving behaviors, purchase behaviors, account use behaviors, etc.), issuing rewards and/or account funds based on the safe driving points, allowing the user to monitor and maintain issued rewards and/or account funds, allowing the user to redeem and/or transfer the rewards, allowing the user to spend and/or transfer the account funds, and other related functions, may be performed in a vehicle maintenance savings account evaluation system 202 rather than by the individual vehicle 204. In such implementations, the vehicle 204 might only collect and transmit vehicle telematics data to a vehicle maintenance savings account evaluation system 202, and thus the vehicle-based vehicle maintenance savings account evaluation unit 208 may be optional.

The vehicle maintenance savings account evaluation unit 208 may be implemented in hardware and/or software configured to receive vehicle telematics data from the vehicle sensors 210, the telematics device 206, and/or other vehicle telematics data sources. After receiving the vehicle telematics data, the vehicle maintenance savings account evaluation unit 208 may perform functions to collect and analyze the vehicle telematics data for safe driving behaviors, provide safe driving points and/or account funds to a user for engaging in certain user behaviors (e.g., safe driving behaviors, purchase behaviors, account use behaviors, etc.), issue rewards and/or account funds based on the safe driving points, allow the user to monitor and maintain issued rewards and/or account funds, allow the user to redeem and/or transfer the rewards, allow the user to spend and/or transfer the account funds, and perform other related functions. For example, the vehicle maintenance savings account evaluation unit 208 may analyze the vehicle telematics data. The vehicle maintenance savings account evaluation unit 208 may use the results of the vehicle telematics data analysis to determine whether the user has engaged in any safe driving behaviors. Further descriptions and examples of the analyses that may be performed by the vehicle maintenance savings account evaluation unit 208 are described below.

The vehicle maintenance savings account evaluation system 202 may also acquire information about certain user behaviors (e.g., safe driving behaviors, purchase behaviors, account use behaviors, etc.). Safe driving behaviors, as used in this description, refer to guidelines for safe driving. User behaviors (e.g., safe driving behaviors, purchase behaviors, account use behaviors, etc.) may be maintained at the vehicle maintenance savings account evaluation system 202 or at the vehicle maintenance savings account evaluation unit 208. Additionally or alternatively, the behaviors may be maintained at a third-party (e.g., account manager) system 244. The vehicle maintenance savings account evaluation system 202 may be in signal communication with the third-party system 244 via a network. The network may include one or more of a wired network (e.g., the Internet), a wireless network (e.g., a cellular network, Bluetooth, NFC or the like), or a combination of wired and/or wireless networks. The vehicle maintenance savings account evaluation system 202 may be in direct communication with a database within the third-party system 244, or may be in indirect communication with a database within the third-party system 244 via a remote service (e.g., a web service). In some examples, regardless of whether the user behaviors may be maintained at the vehicle maintenance savings account evaluation system 202, vehicle maintenance savings account evaluation unit 208, or third-party system 244, an account manager (e.g., an insurance company) may update the user behaviors by adding new user behaviors or modifying existing user behaviors. Where the vehicle maintenance savings account evaluation system 202 determines, based on the vehicle telematics data, that a user has engaged in safe driving behaviors, the vehicle maintenance savings account evaluation system 202 may provide safe driving points and/or account funds to the user.

The vehicle maintenance savings account evaluation system 202 may communicate the user's safe driving status (e.g., number of safe driving points and/or amount of funds earned) to the third-party system 244. The vehicle maintenance savings account evaluation system 202 may be in signal communication with the third-party system 244 via a network such as those described above. In some embodiments, an account manager (e.g., an insurance company) may use the safe driving data communicated to the third-party system 244 to create competition among users and issue additional rewards and/or account funds. For example, an account manager (e.g., an insurance company) may gamify the collection of safe driving points and/or account funds by providing a leaderboard that lists users' safe driving points, rewards and/or earned account funds. The leaderboard may also list, for example, the user behaviors (e.g., safe driving behaviors, purchase behaviors, account use behaviors, etc.) of all listed users for a particular period of time (e.g. hours, days, weeks, months, etc.).

In some examples, the vehicle maintenance savings account evaluation system 202 may provide an electronic communication interface for the user to track driving performance, vehicle maintenance, account funds, safe driving points and/or rewards earned, and the safe driving points and/or account funds leaderboard. As such, the electronic communication interface may enable the user to identify strengths and weaknesses, and to identify trends. Additionally, the electronic communication interface may enable the user to view issued awards and earned account funds, redeem and/or transfer the awards, and spend and/or transfer the account funds. The electronic communication interface may be accessible via, for example, a web browser, desktop application, mobile application, or the like that resides at the vehicle maintenance savings account system 101. In some examples, the electronic communication interface may reside on the mobile special-purpose computing device 212. In other examples, the electronic communication interface may be accessible through a separate computer 240.

Figure 3:
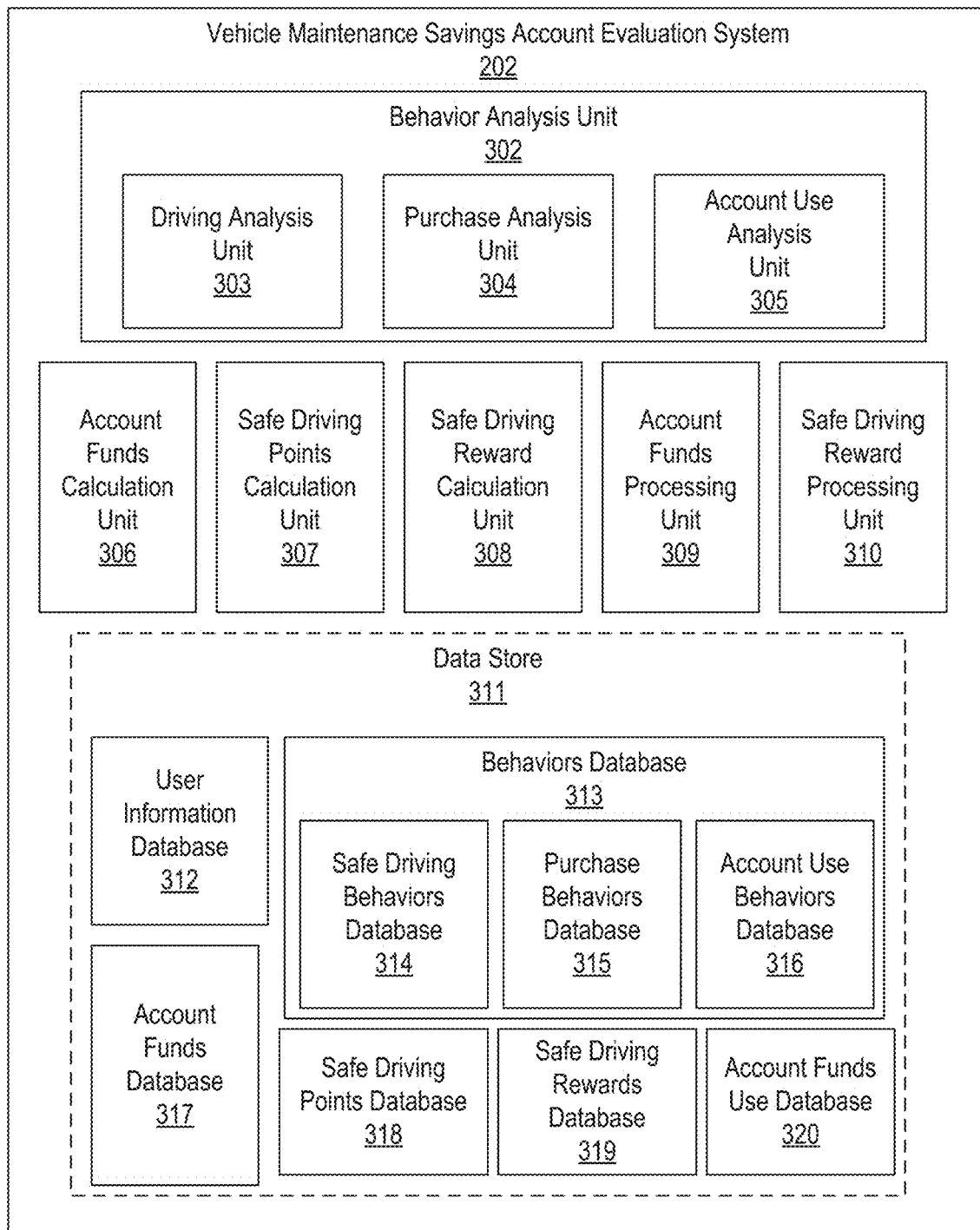
FIG. 3 is a block diagram of an example of an implementation of a vehicle maintenance savings account evaluation system according to one or more aspects of the disclosure.

FIG. 3 shows an example implementation of a vehicle maintenance savings account evaluation system 202. In some example implementations, the vehicle maintenance savings account evaluation system 202 is a special-purpose computing device programmed with instructions that, when executed, perform functions associated with using user data to reward users for engaging in certain user behaviors (e.g., safe driving behaviors, purchase behaviors, account use behaviors, etc.). In these example implementations, units 302-320 of the vehicle maintenance savings account evaluation system 202 correspond to particular sets of instructions embodied as software programs residing at the vehicle maintenance savings account evaluation system 202. In other example implementations, the vehicle maintenance savings account evaluation system 202 is a collection of special-purpose computing devices that are interconnected and in signal communication with each other. In these examples, each unit 302-320 of the vehicle maintenance savings account evaluation system 202 respectively corresponds to a special-purpose computing device programmed with a particular set of instructions, that, when executed, perform respective functions associated with using user data to reward users for engaging in certain user behaviors (e.g., safe driving behaviors, purchase behaviors, account use behaviors, etc.). Such special-purpose computing devices may be, for example, application servers programmed to perform the particular set of functions.

The vehicle maintenance savings account evaluation system 202, in this example, includes various units and databases that facilitate collecting and analyzing vehicle telematics data for safe driving behaviors, providing safe driving points and/or account funds to a user for engaging in certain user behaviors (e.g., safe driving behaviors, purchase behaviors, account use behaviors, etc.), issuing rewards and/or account funds based on the safe driving points, allowing the user to monitor and maintain issued rewards and/or account funds, allowing the user to redeem and/or transfer the rewards, allowing the user to spend and/or transfer the account funds, and performing other related functions. It will be appreciated that the vehicle maintenance savings account evaluation system 202 illustrated in FIG. 3 is shown by way of example and that other implementations of the vehicle maintenance savings account evaluation system 202 may include additional or alternative units and databases without departing from the scope of the claimed subject matter. In this example, the vehicle maintenance savings account evaluation system 202 includes a behavior analysis unit 302 having a driving analysis unit 303, purchase analysis unit 304 and account use analysis unit 305; an account funds calculation unit 306; a safe driving points calculation unit 307; a safe driving reward calculation unit 308; an account funds processing unit 309; a safe driving reward processing unit 310; and a data store 311. The behavior analysis unit 302 may contain or may be integral with one or more of the driving analysis unit 303, purchase analysis unit 304 and account use analysis unit 305. In certain embodiments, the account funds calculation unit 306 may contain or may be integral with one or more of the safe driving points calculation unit 307, safe driving reward calculation unit 308, account funds processing unit 309 and safe driving reward processing unit 310.

The data store 311 may store information related to certain user behaviors (e.g., safe driving behaviors, purchase behaviors, account use behaviors, etc.), users, safe driving points, account funds, safe driving rewards and the use of account funds. For example, the data store 311 may include a user information database 312, a behaviors database 313, a safe driving behaviors database 314, a purchase behaviors database 315, an account use behaviors database 316, an account funds database 317, a safe driving points database 318, a safe driving rewards database 319 and an account funds use database 320. The vehicle maintenance savings account evaluation system 202 may utilize this information in determining certain user behaviors (e.g., safe driving behaviors, purchase behaviors, account use behaviors, etc.), providing safe driving points, issuing rewards and/or account funds, allowing the user to monitor and maintain issued rewards and/or account funds, allowing the user to redeem and/or transfer the rewards, allowing the user to spend and/or transfer the account funds, and performing other related functions. The behaviors database 313 may contain or may be integral with one or more of the safe driving behaviors database 314, purchase behaviors database 315 and account use behaviors database 316. In certain embodiments, the account funds database 317 may contain or may be integral with one or more of the safe driving points database 318, safe driving rewards database 319 and account funds use database 320. It will be appreciated that, in other examples, the data store 311 may include additional and/or alternative databases. For example, it may be advantageous to group the information by an insurance company of an insurance policy held by a user. Alternatively, information associated with non-insured users may be maintained separately from insured users.

The user information database 312 may store information associated with users of the vehicle maintenance savings account (e.g., vehicle maintenance savings account number, username and password, vehicle identification, mobile device identification, vehicle registration information, account beneficiary information, user name, age, contact information, social media account identification information, bank account information, credit card information, social security number, driver's license number, state identification number, passport number, driver score, etc.). In some examples, the user information database 312 may also store the user's affiliation with one or more insurance companies.

The behaviors database 313 may store information associated with the behaviors (e.g., safe driving behaviors, purchase behaviors, account use behaviors, etc.) required to earn safe driving points and/or account funds (e.g., balance-affecting behaviors/events). As discussed above, the behaviors database 313 may contain or may be integral with one or more of the safe driving behaviors database 314, purchase behaviors database 315 and account use behaviors database 316. The behaviors database 313 may associate each type/category of behavior (e.g., safe driving behavior, purchase behavior, account use behavior, etc.) with a numerical value. The numerical value may reflect the behavior's importance in terms of driving safety, vehicle maintenance and/or account manager data collection. In some examples, the numerical value may be a number of safe driving points and/or an amount of account funds.

It will be appreciated that the behaviors database 313 may be optional in some example implementations of a vehicle maintenance savings account evaluation system 202. For instance, where the vehicle maintenance savings account evaluation system 202 may acquire the behaviors (e.g., safe driving behaviors, purchase behaviors, account use behaviors, etc.) from a third-party system 244, the behaviors database 313 may be duplicative.

The safe driving behaviors database 314 may store information associated with the safe driving behaviors that may earn safe driving points and/or account funds. As such, the safe driving behaviors database 314 may associate each safe driving behavior with a numerical value. The numerical value may reflect the safe driving behavior's importance in terms of driving safety and/or vehicle maintenance. In some examples, the numerical value may be a number of safe driving points and/or an amount of account funds.

Safe driving behaviors may be defined as one or more driving events. A driving event may be based on the speed, acceleration, braking, turning, distance to other vehicles, seat belt usage, turn signal usage, route, time of day, and other vehicle telematics data collected from the vehicle 204. Thus, it will be appreciated that a variety of different safe driving behaviors may be defined based on a variety of different driving events. Further, a safe driving behavior may be defined in terms of distance travelled (e.g., one hundred miles, fifty miles, twenty-five miles, ten miles, five miles, 1 mile, etc.) and/or time elapsed (e.g., one hour, thirty minutes, fifteen minutes, ten minutes, five minutes, etc.) during a trip (e.g., a period of time starting when the vehicle is turned on and ending when the vehicle is turned off). For example, a safe driving behavior based in part on speed may be a trip including 1 hour of highway driving within 5 mph of the prescribed speed limit. An example safe driving behavior based in part on braking or deceleration may be a trip including thirty minutes of city driving without occurrences of hard braking (e.g., deceleration of 7 mph/s or greater, etc.). An example safe driving behavior based in part on acceleration may be a trip including 30 minutes of highway driving without occurrences of fast acceleration (e.g., acceleration of 10 mph/s or greater, etc.). An example safe driving behavior based in part on turning may be a trip including fifty miles of driving with only soft turns (e.g., angle of turn greater than 90°, controlled turns, etc.). Another exemplary safe driving behavior may be activating a turn signal at least one hundred feet before initiating each turn of the trip. Safe driving conditions may also be based in part on particular driving conditions. For example, a safe driving behavior may be driving at least 10 mph below the speed limit during periods of the trip including inclement or severe weather (e.g., rain, snow, fog, etc.).

In certain embodiments, safe driving behaviors include the user taking steps in furtherance of minimizing risks and becoming and/or remaining a safe driver. For example, further non-limiting examples of safe driving behaviors include enrollment in, use of and/or attendance of certain programs or courses (e.g., a driver's safety and/or education program or course, an attention improvement/maintenance program or course, a visual acuity improvement/maintenance program or course, and the like), not driving (e.g., carpooling, taking public transportation, hiring a taxi, private driver or driving service, etc.), downloading and/or using safe driver, fuel and/or vehicle data mobile applications, purchase and/or use of certain products (e.g. insurance products, vehicle safety products, vehicle monitors/sensors, vehicle replacement parts, after-market vehicle safety products, and the like), participating in certain insurance programs, obtaining regular vehicle check-ups, utilizing certain insurance services, renewing an insurance policy, expanding existing insurance coverage, maintaining/meeting a regular schedule of maintenance, being claim free and/or accident free for a particular period of time, making necessary vehicle repairs within a particular period of time (e.g., 1 hour, 5 hours, 10 hours, 1 day, 5 days, 1 week, etc.), obtaining all necessary vehicle inspections/testing, and the like. It will be appreciated that additional or alternative safe driving behaviors may be selectively defined and implemented to encourage safe driving when operating a vehicle.

In some embodiments, a safe driving behavior category may be associated with a safe driving behavior in the safe driving behaviors database 314. For example, safe driving behaviors based in part on speed may be associated with a safe speed driving behavior category. Similarly, safe driving behaviors based in part on braking may be associated with a safe braking driving behavior category. Other examples of safe driving behavior categories may include safe turning driving behavior, safe signaling driving behavior, safe distance driving behavior, safe mobile device usage driving behavior, safe travel route driving behavior, and so forth.

In some examples, a safe driving behavior in the safe driving behaviors database 314 may be assigned a weight, where the weight may be used in calculating safe driving points and/or account funds to be deposited in a vehicle maintenance savings account. Additionally or alternatively, a safe driving behavior category may be assigned a weight, whereby one or more of the safe driving behaviors associated with the safe driving behavior category may be assigned a weight according to the weight assigned to the safe driving behavior category. For example, where a safe driving behavior category is assigned a particular weight, all safe driving behaviors associated with the safe driving behavior category may be assigned the same weight. In another example, the weight assigned to a safe driving behavior category may be used as a default weight, which will be overridden by a weight assigned specifically to a safe driving behavior associated with the safe driving behavior category. The calculation of safe driving points and account funds will be described in further detail below.

In some embodiments, the safe driving behaviors database 314 may store safe driving behaviors as specified by different account managers. For example, the safe driving behaviors database 314 may maintain one set of safe driving behaviors for Insurance Company A, and another set of safe driving behaviors for Insurance Company B. In some examples, the sets of driving behaviors for Insurance Company A and Insurance Company B may overlap.

It will be appreciated that the safe driving behaviors database 314 may be optional in some example implementations of a vehicle maintenance savings account evaluation system 202. For instance, where the vehicle maintenance savings account evaluation system 202 may acquire the safe driving behaviors from a third-party system 244, the safe driving behaviors database 314 may be duplicative.

The purchase behaviors database 315 may store information associated with purchase restrictions and/or the purchase behaviors that may earn safe driving points and/or account funds. As such, the purchase behaviors database 315 may associate each purchase behavior with a numerical value. The numerical value may reflect the purchase behavior's importance in terms of driving safety, vehicle maintenance and/or account manager data collection. In some examples, the numerical value may be a number of safe driving points and/or an amount of account funds.

Purchase behaviors may be defined as one or more purchasing, enrolling or subscribing events. Exemplary purchasing events include, but are not limited to, purchasing of or enrollment in a driver's education/safety program/course, an attention improvement/maintenance course/program, a visual acuity improvement/maintenance program/course and certain insurance programs/services/courses. Further non-limiting examples of purchasing events include purchase of insurance products (e.g., a home and/or auto insurance policy), safety products, fuel, vehicle parts (e.g., after-market parts such as a heads-up display; and replacement parts including batteries, brakes, tires, shocks, windshield wipers, brake pads, etc.), telematics devices, vehicle sensors/monitors, products necessary for vehicle maintenance/repair (e.g., oil, windshield wiper fluid, brake fluid, coolant, transmission fluid, etc.). Payments associated with vehicle maintenance (e.g., check-ups), repair, insurance (e.g., insurance premiums, insurance deductibles, etc.) and governmental compliance (e.g., inspections, registration, emissions testing, government stickers, taxes, license plates, disposal fees, etc.) are further non-limiting examples of purchasing events. In certain instances, purchase of a new vehicle of a certain type (e.g., hybrid, fuel-efficient, etc.) may qualify as a purchasing event. It will be appreciated that a variety of different purchase behaviors may be defined based on a variety of different purchase events. It will be further appreciated that additional or alternative purchase behaviors may be selectively defined and implemented to encourage safe driving, vehicle maintenance and/or account manager data collection.

In some embodiments, a purchase behavior category may be associated with a purchase behavior in the purchase behaviors database 315. For example, purchase behaviors based in part on vehicle maintenance may be associated with a vehicle maintenance purchase behavior category. Similarly, purchase behaviors based in part on vehicle repair may be associated with a vehicle repair purchase behavior category. Other examples of purchase behavior categories may include, but are not limited to, vehicle safety purchase behavior, vehicle insurance purchase behavior, governmental compliance purchase behavior, and so forth.

In some examples, a purchase behavior in the purchase behaviors database 315 may be assigned a weight, where the weight may be used in calculating safe driving points and/or account funds. For instance, purchase of a program, course, service or product from a particular authorized, certified or preferred merchant, shop or provider may be weighted greater than purchase of a program, course, service or product from an unauthorized, uncertified or non-preferred merchant, shop or provider. Similarly, purchase of authorized, certified or preferred programs, courses, services or products may be weighted greater than purchase of unauthorized, uncertified or non-preferred programs, courses, services or products. Additionally or alternatively, a purchase behavior category may be assigned a weight, whereby one or more of the purchase behaviors associated with the purchase behavior category may be assigned a weight according to the weight assigned to the purchase behavior category. For example, where a purchase behavior category is assigned a particular weight, all purchase behaviors associated with the purchase behavior category may be assigned the same weight. In another example, the weight assigned to a purchase behavior category may be used as a default weight, which will be overridden by a weight assigned specifically to a purchase behavior associated with the purchase behavior category.

In some embodiments, the purchase behaviors database 315 may store purchase behaviors as specified by different account managers. For example, the purchase behaviors database 315 may maintain one set of purchase behaviors for Insurance Company A, and another set of purchase behaviors for Insurance Company B. In some examples, the sets of purchase behaviors for Insurance Company A and Insurance Company B may overlap.

It will be appreciated that the purchase behaviors database 315 may be optional in some example implementations of a vehicle maintenance savings account evaluation system 202. For instance, where the vehicle maintenance savings account evaluation system 202 may acquire the purchase behaviors from a third-party system 244, the purchase behaviors database 315 may be duplicative.

The account use behaviors database 316 may store information associated with account use restrictions and/or the account use behaviors that may earn safe driving points and/or account funds. As such, the account use behaviors database 316 may associate each account use behavior with a numerical value. The numerical value may reflect the account use behavior's importance in terms of driving safety, vehicle maintenance and/or account manager data collection. In some examples, the numerical value may be a number of safe driving points and/or an amount of account funds.

Account use behaviors may be defined as one or more account use events. Exemplary account use events include, but are not limited to, using the vehicle maintenance savings account to pay for the costs of maintaining and/or operating a vehicle (e.g., costs of maintenance and operation associated with ownership, leasing or renting a vehicle) and/or driver safety, including any of such costs detailed herein. For instance, account use events may include using the account to pay for driver's education, driver's safety courses, attention improvement/maintenance courses, visual acuity improvement/maintenance courses, vehicle maintenance, repair, inspections, registration, check-ups, replacement parts, emissions testing, government stickers, taxes, license plates, insurance premiums, insurance deductibles, safety products, sensors/monitors, disposal fees, new vehicles of a certain type, etc. Further non-limiting examples of account use events include user social behaviors that advertise an account manager's vehicle maintenance savings account program and/or encourage safe driving, vehicle maintenance and sharing of data with the account manager. Non-limiting examples of such social behaviors include referring friends/family to an account manager's vehicle maintenance savings account program, rewards program, safe driving program, telematics program or other program/service/product; referring non-account manager (e.g., insurance company) customers to the account manager; using social media (e.g., Facebook, Twitter, Instagram, and/or other social media tools) to recommend and/or advertise an account manager's vehicle maintenance savings account program, rewards program, safe driving program, telematics program or other program/service/product (e.g., via posting about the program/service/product, "liking" a Facebook page and/or post associated with the program/service/product, "tweeting" about the program/service/product, etc.) or to document the user's vehicle maintenance savings account progress (e.g., safe driving behaviors, purchase behaviors, account use behaviors, accumulation of account funds and/or safe driving points, redemption of safe driving rewards, use of account funds, transfer of account funds and/or safe driving points, participation in a vehicle maintenance savings account funds pool, etc.); joining a vehicle maintenance savings account funds pool; participating in a program that allows for provider/service recommendations to be provided to the user; and the like. Further non-limiting examples of account use events include downloading an account manager (e.g., insurance company) mobile application (e.g., vehicle maintenance savings account mobile application, safe driving mobile application, telematics mobile application, fuel mobile application, etc.); running an account manager (e.g., insurance company) mobile application (e.g., vehicle maintenance savings account mobile application, safe driving mobile application, telematics mobile application, fuel mobile application, etc.) on a user mobile device for a particular period of time; providing data to a manager of the vehicle maintenance savings account (regarding, e.g., vehicle repair, vehicle maintenance, telematics, insurance, etc.); participating in a rewards program of particular fuel station and/or oil company; using the vehicle maintenance savings account during and/or within a particular time period; adding additional vehicles to the account; and the like.

It will be appreciated that a variety of different account use behaviors may be defined based on a variety of different account use events. It will be further appreciated that additional or alternative account use behaviors may be selectively defined and implemented to encourage safe driving, vehicle maintenance and/or account manager data collection.

In some embodiments, an account use behavior category may be associated with an account use behavior in the account use behaviors database 316. For example, account use behaviors based in part on using the vehicle maintenance savings account to pay for the costs of maintaining and/or operating a vehicle (e.g., costs of maintenance and operation associated with ownership, leasing or renting a vehicle) may be associated with a vehicle possession account use behavior category. Similarly, account use behaviors based in part on using the vehicle maintenance savings account to pay for the costs of driver safety may be associated with a driver safety account use behavior category. Other examples of account use behavior categories may include, but are not limited to, social account use behavior, funds pool account use behavior, mobile application account use behavior, rewards program account use behavior, and so forth.

In some examples, an account use behavior in the account use behaviors database 316 may be assigned a weight, where the weight may be used in calculating safe driving points and/or account funds. For instance, use of the account to purchase a program, course, service or product from a particular authorized, certified or preferred merchant, shop or provider may be weighted greater than use of the account to purchase a program, course, service or product from an unauthorized, uncertified or non-preferred merchant, shop or provider. Similarly, using the account to purchase authorized, certified or preferred programs, courses, services or products may be weighted greater than using the account to purchase unauthorized, uncertified or non-preferred programs, courses, services or products. Additionally or alternatively, an account use behavior category may be assigned a weight, whereby one or more of the account use behaviors associated with the account use behavior category may be assigned a weight according to the weight assigned to the account use behavior category. For example, where an account use behavior category is assigned a particular weight, all account use behaviors associated with the account use behavior category may be assigned the same weight. In another example, the weight assigned to an account use behavior category may be used as a default weight, which will be overridden by a weight assigned specifically to an account use behavior associated with the account use behavior category.

In some embodiments, the account use behaviors database 316 may store account use behaviors as specified by different account managers. For example, the account use behaviors database 316 may maintain one set of account use behaviors for Insurance Company A, and another set of account use behaviors for Insurance Company B. In some examples, the sets of account use behaviors for Insurance Company A and Insurance Company B may overlap.

It will be appreciated that the account use behaviors database 316 may be optional in some example implementations of a vehicle maintenance savings account evaluation system 202. For instance, where the vehicle maintenance savings account evaluation system 202 may acquire the account use behaviors from a third-party system 244, the account use behaviors database 316 may be duplicative.

It will be appreciated that a variety of different behaviors may be defined based on a variety of different behavior types/categories (e.g., safe driving behaviors, purchase behaviors, account use behaviors, etc.) and that the different behavior types/categories may overlap. For instance, purchase of a driver safety program/course by a user with the vehicle maintenance savings account may qualify as a safe driving behavior, purchase behavior and account use behavior. Purchase of a driver safety program/course by a user via a means other than the vehicle maintenance savings account may still qualify as a safe driving behavior, purchase behavior and account use behavior, for example, if the user shares the occurrence of such purchase socially (e.g., via social media or the like) and/or with the account manager (e.g., via a mobile application, website, etc.).

The account funds database 317 may store information associated with the account funds deposited, earned and/or accumulated by a user. The account funds database 317 may enable the vehicle maintenance savings account evaluation system 202 to maintain the amount of account funds deposited, earned and/or accumulated by a user. Thus, the account funds database 317 may maintain, e.g., through a database relationship, an association between a user in the user information database 312, and the amount of account funds deposited, earned and/or accumulated by a user. According to certain embodiments, the account funds database 317 may enable the vehicle maintenance savings account evaluation system 202 to maintain all account funds together, with no distinction between money, money-proxy, Superdollars (e.g., a percentage and/or multiple of a dollar), interest, etc. In other embodiments, the account funds database 317 may enable the vehicle maintenance savings account evaluation system 202 to partition account funds based on funds type and/or source. For instance, in some aspects, the account funds database 317 enables the vehicle maintenance savings account evaluation system 202 to partition account funds based on funds type (e.g., money or money proxy). In other aspects, the account funds database 317 enables the vehicle maintenance savings account evaluation system 202 to partition account funds based on two or more funds sources (e.g., funds provided by account manager, funds deposited by user, interest earned on funds provided by account manager, interest earned on funds deposited by user, funds transferred from another user and/or funds pool, Superdollars, interest earned on Superdollars, etc.). As will be described in further detail below, the vehicle maintenance savings account evaluation system 202 may provide a user with account funds based at least on the information stored in the account funds database 317 and one or more of the behaviors database 313, safe driving behaviors database 314, purchase behaviors database 315, and account use behaviors database 316.

The safe driving points database 318 may store information associated with the safe driving points provided to a user. The safe driving points database 318 may enable the vehicle maintenance savings account evaluation system 202 to maintain the number of safe driving points earned by a user. Thus, the safe driving points database 318 may maintain, e.g., through a database relationship, an association between a user in the user information database 312, and the number of safe driving points earned by a user. As will be described in further detail below, the vehicle maintenance savings account evaluation system 202 may provide a user with safe driving points based at least on the information stored in the safe driving behaviors database 314 and the safe driving points database 318.

The safe driving rewards database 319 may store information associated with rewards issued to a user. The safe driving rewards database 319 may enable the vehicle maintenance savings account evaluation system 202 to maintain rewards issued to the user. In some examples, the safe driving rewards database 319 may store information regarding a status of each reward (e.g., Unused, Used, Expired, etc.), a mechanism for redemption (e.g., a coupon code, a QR code, a barcode, an account code, etc.), and one or more vendors (e.g., one or more vehicle service systems 242 and/or one or more third-party systems 244) where the reward may be redeemed. As will be described in further detail below, the vehicle maintenance savings account evaluation system 202 may provide a user with rewards based on at least the information stored in the safe driving points database 318 and the safe driving rewards database 319.

In certain embodiments, the user is a particular vehicle associated with the vehicle maintenance savings account and the safe driving points database 318 may store information associated with the safe driving points for a user (e.g., particular vehicle). In this example, the safe driving points database 318 may enable the vehicle maintenance savings account evaluation system 202 to maintain the number of safe driving points earned with respect to a particular vehicle based on the telematics data collected for that vehicle. Accordingly, the safe driving rewards database 319 may store information associated with rewards issued for a particular user (e.g., vehicle). As such, the vehicle maintenance savings account evaluation system 202 may provide rewards to an individual associated with the user (e.g., vehicle) based at least on the information stored in the user information database 312. Where multiple individuals are associated with a vehicle (e.g., a shared vehicle), the vehicle maintenance savings account evaluation system 202 may provide rewards to an individual designated as the primary driver of the vehicle, or distribute the rewards between each of the individuals (e.g., proportional to driving time, proportional to ownership interest, equally, etc.). In some examples, the vehicle maintenance savings account evaluation system 202 may vary the rewards based on the individual's association with an account manager (e.g., an insurance company), such that an account manager customer may receive more or less of a reward than a non-account manager customer for the engaging in same or similar driving behaviors.

The account funds use database 320 may store information associated with the use of account funds deposited, earned and/or accumulated by a user. The account funds use database 320 may enable the vehicle maintenance savings account evaluation system 202 to place restrictions (e.g, spending and/or transfer restrictions) on the use of account funds. The account funds use database 320 may, for instance, enable the vehicle maintenance savings account evaluation system 202 to restrict use of the account funds to purchases of particular products (e.g., certain safety products, vehicle parts, etc.), particular vendors and/or particular transfers (e.g., to a vehicle maintenance savings account funds pool). In some embodiments, only a percentage or certain type (e.g., money, money proxy, interest, Superdollars, etc.) of funds may be used in a certain location (e.g., at a particular vendor/service provider). In some aspects, the amount of funds transferable from one vehicle maintenance savings account to another (e.g., for a vehicle maintenance savings account funds pool) may be limited. According to various aspects, the spending and/or transfer restrictions may be designated by the user and/or the manager of the account. A user may, for example, set restrictions in order to avoid loss of account funds in the event an account/fob is lost or stolen. In some examples, a user may set restrictions in order to avoid a user in a group of users using all of the funds at one time. Parent users may restrict a child's use of the account to purchase of certain items or services (e.g., gas or other items at gas station; only gas at a gas station, and not food or other products, etc.). In certain instances, the account manager may only permit transfer of a portion of the account balance. In some examples, the account funds use database 320 may store information regarding a type of funds (e.g., money, money-proxy, Superdollars, interest, etc.), a status of each type of funds (e.g., Unused, Used, Expired, Spent, Transferred, etc.), a mechanism for redemption (e.g., a coupon code, a QR code, a barcode, an account code, etc.), and one or more vendors (e.g., one or more vehicle service systems 242 and/or one or more third-party systems 244) where the account funds may be spent. As will be described in further detail below, the vehicle maintenance savings account evaluation system 202 may allow a user to spend and/or transfer account funds based on at least the information stored in the account funds use database 320, account funds database 317 and one or more of the behaviors database 313, safe driving behaviors database 314, purchase behaviors database 315, and account use behaviors database 316.

In certain embodiments, the user is a particular vehicle associated with the vehicle maintenance savings account and the account funds database 317 may store information associated with the account funds for a user (e.g., particular vehicle). In this example, the account funds database 317 may enable the vehicle maintenance savings account evaluation system 202 to maintain the amount of account funds deposited, earned and/or accumulated with respect to a particular vehicle based on the telematics data collected for that vehicle. Accordingly, the account funds use database 320 may store information associated with use of account funds deposited, earned and/or accumulated for a particular user (e.g., vehicle). As such, the vehicle maintenance savings account evaluation system 202 may provide account funds to an individual associated with the user (e.g., vehicle) based at least on the information stored in the user information database 312. Where multiple individuals are associated with a vehicle (e.g., a shared vehicle), the vehicle maintenance savings account evaluation system 202 may provide account funds to an individual designated as the primary driver of the vehicle, or distribute the account funds between each of the individuals (e.g., proportional to driving time, proportional to ownership interest, equally, etc.). In some examples, the vehicle maintenance savings account evaluation system 202 may vary the amount and/or type of account funds (e.g., Superdollars, interest, money, money-proxy, etc.) based on the individual's association with an account manager (e.g., an insurance company), such that an account manager customer may receive more or less account funds than a non-account manager customer for the engaging in same or similar driving behaviors.

Figure 4:
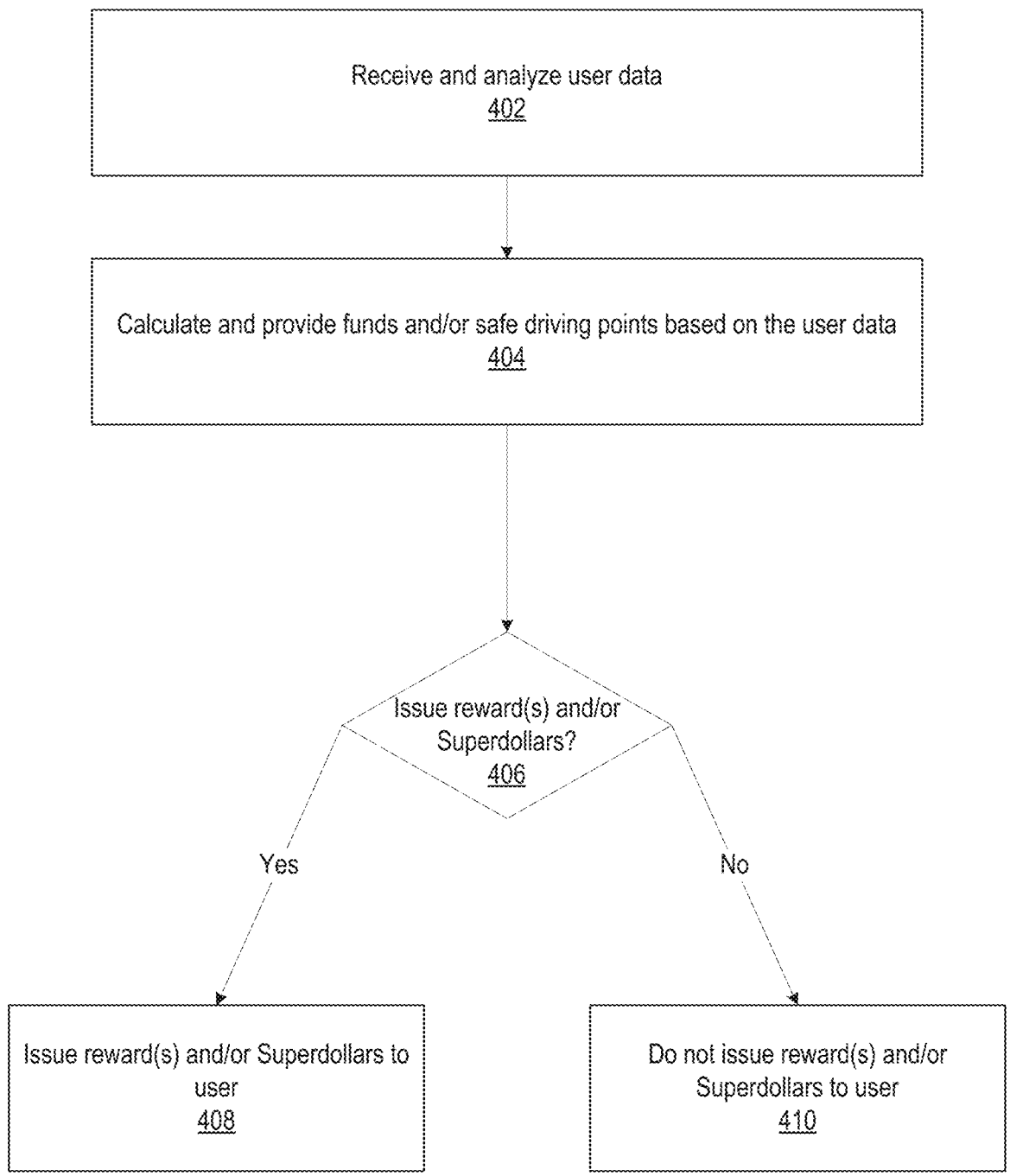
FIG. 4 is a flowchart of an example method of analyzing user data and providing account funds, safe driving points and/or rewards based on the user data according to one or more aspects of the disclosure.

Referring now to FIG. 4, a flowchart of high-level example steps for analyzing user data and providing account funds, safe driving points and/or rewards based on the user data is shown. The various components of the vehicle maintenance savings account evaluation system 202 may be used to perform these method steps. In certain embodiments, user data may be vehicle telematics data including data received from one or more telematics devices 206, vehicle sensors 210, or vehicle subsystems and then transmitted to a system or device located remotely relative to the vehicle. Additionally or alternatively, user data may be user purchase data including data received from one or more vehicle service devices or systems 242, third-party devices or systems 244, and/or other devices or subsystems associated with vehicle possession, operation and maintenance, and then, optionally, transmitted to a system or device located remotely relative to the transmitting device(s) or subsystem(s). Additionally or alternatively, user data may be account use data including data received from one or more vehicle maintenance savings account devices or subsystems, vehicle service devices or subsystems, third-party devices or subsystems, social media devices or subsystems, and/or other devices or subsystems associated with vehicle possession, operation and maintenance and then, optionally, transmitted to a system or device located remotely relative to the transmitting device(s) or subsystem(s); etc.). User data (e.g., vehicle telematics data, user purchase data, account use data, etc.) may also include data received from a mobile computing device (e.g., mobile phone, portable computing device, mobile special-purpose computing device 212 or the like) or a third-party system 244 (e.g., a third party telematics system).

The driving analysis unit 303 may receive and analyze vehicle telematics data (block 402) from the vehicle 204 (e.g., by a telematics device 206 installed at or attached to the vehicle 204, and/or by one or more sensors 210 installed at, attached to, and/or remotely located relative to the vehicle 204), from a mobile special-purpose computing device 212 (e.g., via a mobile application installed on the mobile special-purpose computing device 212), or a combination thereof. The driving analysis unit 303 may analyze the vehicle telematics data to identify one or more driving events, one or more driving behaviors, and/or one or more driving conditions as described above. The driving analysis unit 303 may generate driving analysis results based on the driving events, behaviors, or conditions, and provide the driving analysis results to the account funds calculation unit 306 and/or the safe driving points calculation unit 307.

In some examples, the vehicle telematics data from the various sources may first be collected at a central location (e.g., at the vehicle maintenance savings account evaluation unit 208, at the mobile special-purpose computing device 212, etc.) and subsequently provided to the driving analysis unit 303. Thus, the driving analysis unit 303 may receive vehicle telematics data from the various sources in real-time, or may receive a compiled version of the vehicle telematics data from the central location. Where the driving analysis unit 303 receives vehicle telematics data in real-time, the driving analysis unit 303 may associate the vehicle telematics data received from the various sources with a single trip. In some examples, the various sources of the vehicle telematics data may assign a unique trip identifier to the vehicle telematics data, such that the driving analysis unit 303 associates all vehicle telematics data assigned to a particular unique trip identifier with a single trip. Additionally or alternatively, the driving analysis unit 303 may receive all vehicle telematics data associated with a trip from the central location. In some embodiments, the driving analysis unit 303 may send the vehicle telematics data to one or more third-parties (e.g., insurance companies) at a third-party system 244 (e.g., insurance system).

The safe driving points calculation unit 307 may calculate and provide safe driving points earned by a user based on the vehicle telematics data received by the driving analysis unit 303 (block 404). The safe driving reward calculation unit 308 may determine whether to issue rewards based on the safe driving points earned by the user (block 406). If the safe driving reward calculation unit 308 determines to issue a reward (block 406), the safe driving reward calculation unit 308 may issue a reward to the user (block 408). In certain embodiments, the reward may be a discount towards a vehicular service/product (e.g., gas, towing, maintenance, repair, new vehicle, inspection, emissions testing, roadside assistance, parts, safety products, sensors/monitors, etc.) and/or third-party service/product (e.g., insurance, fleet management, driver's education, DMV, government fees/requirements, driver's safety, attention improvement/maintenance, visual acuity improvement/maintenance, etc.). The reward may be redeemable at a vehicle service system 242 or a third-party system 244 via a mechanism for redemption (e.g., a coupon code, QR code, barcode, account code, etc.). Alternatively or additionally, the reward may be a rebate or funds, and may be redeemable at the user's vehicle maintenance savings account (e.g., the reward may be deposited into a user's vehicle maintenance savings account). In some examples, the reward may be stored in the vehicle maintenance savings account as a reward. Alternatively, the reward may be converted to funds that are stored in the account. Conversely, if the safe driving reward calculation unit 308 determines not to issue a reward (block 406), then the safe driving reward calculation unit 308 may not issue a reward to the user (block 410).

Additionally or alternatively, the account funds calculation unit 306 may calculate and provide account funds earned by a user based on the vehicle telematics data received by the driving analysis unit 303 (block 404). In certain embodiments, the account funds calculation unit 306 may convert safe driving points earned by a user directly into account funds (block 404) (e.g., without calculation and/or issuance of a reward based on safe driving points earned by the user). In certain aspects, the account funds calculation unit 306 may determine whether to issue Superdollars based on the safe driving points earned by the user and/or the particular safe driving behavior and/or event (block 406). If the account funds calculation unit 306 determines to issue Superdollars (block 406), the account funds calculation unit 306 may issue Superdollars to the user (block 408). For example, a user (e.g., driver) who carpools may earn 120% of a dollar if the user drives with passengers. In another example, a user (e.g., a passenger) may earn 20% of a dollar just for being a passenger in a carpool. In certain embodiments, the Superdollars may be restricted to use towards a vehicular service/product (e.g., gas, towing, maintenance, repair, new vehicle, inspection, emissions testing, roadside assistance, parts, safety products, sensors/monitors, etc.) and/or third-party service/product (e.g., insurance, fleet management, driver's education, DMV, government fees/ requirements, driver's safety, attention improvement/maintenance, visual acuity improvement/maintenance, etc.). In some aspects, the cost of a particular product or service may be reduced if Superdollars are used to pay for such. The Superdollars may be redeemable at a vehicle service system 242 or a third-party system 244 via a mechanism for redemption (e.g., a coupon code, QR code, barcode, account code, etc.). Conversely, if the account funds calculation unit 306 determines not to issue Superdollars (block 406), then the account funds calculation unit 306 may not issue Super-Dollars to the user (block 410).

The purchase analysis unit 304 may receive and analyze user purchase data (block 402) from, for example, a mobile special-purpose computing device 212 (e.g., via a mobile application installed on the mobile special-purpose computing device 212), vehicle service system 242, third-party system 244 or combination thereof. The purchase analysis unit 304 may analyze the user purchase data to identify one or more purchasing events and/or one or more purchasing behaviors as described above. The purchase analysis unit 304 may generate purchasing analysis results based on the purchasing events and/or behaviors, and provide the purchasing analysis results to the account funds calculation unit 306 and/or the safe driving points calculation unit 307.

In some examples, the user purchase data from the various sources may first be collected at a central location (e.g., at the vehicle maintenance savings account evaluation unit 208, at the mobile special-purpose computing device 212, etc.) and subsequently provided to the purchase analysis unit 304. Thus, the purchase analysis unit 304 may receive user purchase data from the various sources in real-time, or may receive a compiled version of the user purchase data from the central location. Where the purchase analysis unit 304 receives user purchase data in real-time, the purchase analysis unit 304 may associate the user purchase data received from the various sources with a single transaction. In some examples, the various sources of the user purchase data may assign a unique transaction identifier to the user purchase data, such that the purchase analysis unit 304 associates all user purchase data assigned to a particular unique transaction identifier with a single transaction. Additionally or alternatively, the purchase analysis unit 304 may receive all user purchase data associated with a transaction from the central location. In some embodiments, the purchase analysis unit 304 may send the user purchase data to one or more third-parties (e.g., insurance companies) at a third-party system 244 (e.g., insurance system).

The account funds calculation unit 306 may calculate and provide account funds earned by a user based on the user purchase data received by the purchase analysis unit 304 (block 404). The account funds calculation unit 306 may determine whether to issue Superdollars based on the account funds earned by the user and the particular purchase behavior and/or event (block 406). If the account funds calculation unit 306 determines to issue Superdollars (block 406), the account funds calculation unit 306 may issue Superdollars to the user (block 408). In certain embodiments, the Superdollars may be restricted to use towards a vehicular service/product (e.g., gas, towing, maintenance, repair, new vehicle, inspection, emissions testing, roadside assistance, parts, safety products, sensors/monitors, etc.) and/or third-party service/product (e.g., insurance, fleet management, driver's education, DMV, government fees/requirements, driver's safety, attention improvement/maintenance, visual acuity improvement/maintenance, etc.). The Superdollars may be redeemable at a vehicle service system 242 or a third-party system 244 via a mechanism for redemption (e.g., a coupon code, QR code, barcode, account code, etc.). Conversely, if the account funds calculation unit 306 determines not to issue Superdollars (block 406), then the account funds calculation unit 306 may not issue Super-Dollars to the user (block 410).

The account use analysis unit 305 may receive and analyze account use data (block 402) from, for example, a mobile special-purpose computing device 212 (e.g., via a mobile application installed on the mobile special-purpose computing device 212), vehicle service system 242, third-party system 244 or combination thereof. The account use analysis unit 305 may analyze the account use data to identify one or more account use events and/or one or more account use behaviors as described above. The account use analysis unit 305 may generate account use analysis results based on the account use events and/or behaviors, and provide the account use analysis results to the account funds calculation unit 306 and/or the safe driving points calculation unit 307.

In some examples, the account use data from the various sources may first be collected at a central location (e.g., at the vehicle maintenance savings account evaluation unit 208, at the mobile special-purpose computing device 212, etc.) and subsequently provided to the account use analysis unit 305. Thus, the account use analysis unit 305 may receive account use data from the various sources in real-time, or may receive a compiled version of the account use data from the central location. Where the account use analysis unit 305 receives account use data in real-time, the account use analysis unit 305 may associate the account use data received from the various sources with a single account use. In some examples, the various sources of the account use data may assign a unique account use identifier to the account use data, such that the account use analysis unit 305 associates all account use data assigned to a particular unique account use identifier with an account use. Additionally or alternatively, the account use analysis unit 305 may receive all account use data associated with an account use from the central location. In some embodiments, the account use analysis unit 305 may send the account use data to one or more third-parties (e.g., insurance companies) at a third-party system 244 (e.g., insurance system).

The account funds calculation unit 306 may calculate and provide account funds earned by a user based on the account use data received by the account use analysis unit 305 (block 404). The account funds calculation unit 306 may determine whether to issue Superdollars based on the account funds earned by the user and the particular account use behavior/event (block 406). If the account funds calculation unit 306 determines to issue Superdollars (block 406), the account funds calculation unit 306 may issue Superdollars to the user (block 408). In certain embodiments, the Superdollars may be restricted to use towards a vehicular service/product (e.g., gas, towing, maintenance, repair, new vehicle, inspection, emissions testing, roadside assistance, parts, safety products, sensors/monitors, etc.) and/or third-party service/product (e.g., insurance, fleet management, driver's education, DMV, government fees/requirements, driver's safety, attention improvement/maintenance, visual acuity improvement/maintenance, etc.). The Superdollars may be redeemable at a vehicle service system 242 or a third-party system 244 via a mechanism for redemption (e.g., a coupon code, QR code, barcode, account code, etc.). Conversely, if the account funds calculation unit 306 determines not to issue Superdollars (block 406), then the account funds calculation unit 306 may not issue SuperDollars to the user (block 410).

Figure 5:
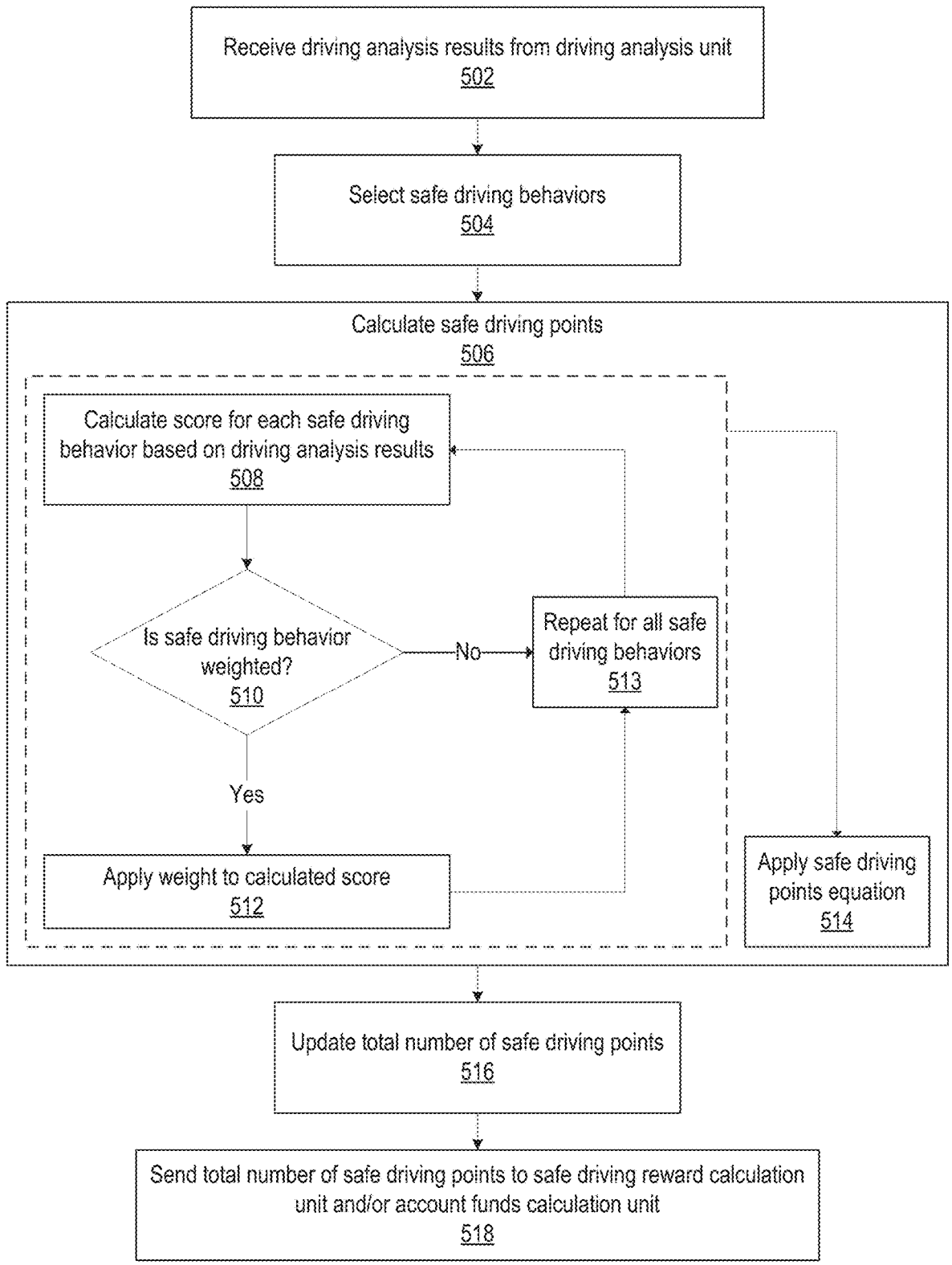
FIG. 5 is a flowchart of an example method of calculating and providing safe driving points to according to one or more aspects of the disclosure.

Referring to FIG. 5, a flowchart of example method steps for calculating and providing safe driving points is shown. The safe driving points calculation unit 307 may be configured to calculate and provide safe driving points on-demand as vehicle telematics data is received and processed by the driving analysis unit 303 (e.g., in real-time, at the end of each trip, etc.), or at regular intervals (e.g., daily, monthly, quarterly, annually, etc.). The safe driving points calculation unit 307 may receive the driving analysis results from the driving analysis unit 303 (block 502). The safe driving points calculation unit 307 may select a set of safe driving behaviors upon which to base the total safe driving points provided to the user (block 504). The set of safe driving behaviors comprise one or more safe driving behaviors defined in the safe driving behaviors database 314. In some embodiments, the set of safe driving behaviors may include all of the safe driving behaviors defined in the safe driving behaviors database 314. In other embodiments, the set of safe driving behaviors may be a subset of the safe driving behaviors defined in the safe driving behaviors database 314. For example, the set of safe driving behaviors may be limited to safe driving behaviors associated with one or more safe driving behavior categories. In another example, the set of safe driving behaviors may be limited to safe driving behaviors associated with a particular third-party or account manager (e.g., insurance company). In yet another example, the set of safe driving behaviors may be based on the driving analysis results received. Thus, the set of safe driving behaviors used to calculate and provide safe driving points may vary for users using the vehicle maintenance savings account acquisition system 100. Alternatively, a uniform set of safe driving behaviors may be employed to calculate and provide safe driving points.

Based on the selected set of safe driving behaviors, the safe driving points calculation unit 307 may calculate a number of safe driving points to provide the user (block 506). For each safe driving behavior in the selected set of safe driving behaviors, the safe driving points calculation unit 307 may calculate a score based on the driving analysis results (block 508). Specifically, the safe driving points calculation unit 307 may first determine whether the safe driving behavior was exhibited in the driving analysis results. For example, where the safe driving behavior is based on maintaining an average speed below 50 mph during a trip, the safe driving points calculation unit 307 may determine whether the driving analysis results for a particular trip reflected an average speed below 50 mph by comparing the average speed of the trip with the 50 mph limit. In some examples, the driving analysis results may include overall trip metrics (e.g., minimum/maximum/average speed, number of hard brakes, total miles traveled, etc.), such that the safe driving points calculation unit 307 may compare the metrics to the requirements of a safe driving behavior. However, in other examples, the safe driving points calculation unit 307 may need to derive one or more trip metrics in order to make a determination as to whether a user engaged in a safe driving behavior. For example, where a safe driving behavior involves two or more conditions (e.g., maintaining an average speed at least 10 mph below the speed limit while driving in rain), the safe driving points calculation unit 307 may create a subset of driving analysis results corresponding to periods of rain, and compute an average speed for the subset of driving analysis results.

Where the safe driving points calculation unit 307 determines that the user engaged in a safe driving behavior based on the driving analysis results, the safe driving points calculation unit 307 may use the numerical value associated with the safe driving behavior in the safe driving behaviors database 314 as the score of the safe driving behavior. The safe driving points calculation unit 307 may adjust the score of the safe driving behavior based on a weight assigned to the safe driving behavior in the safe driving behaviors database 314 (block 510). Where the safe driving behavior is assigned a weight, the safe driving points calculation unit 307 may combine the score of the safe driving behavior with the weight of the safe driving behavior (e.g., by multiplying the weight and the numerical value) (block 512). Additionally or alternatively, the safe driving points calculation unit 307 may use the weight assigned to the safe driving behavior category associated with the safe driving behavior in the safe driving behaviors database 314 to adjust the score of the safe driving behavior.

The safe driving points calculation unit 307 may repeat these method steps (blocks 508, 510 and 512) for all safe driving behaviors in the selected set of safe driving behaviors (block 513). As such, the safe driving points calculation unit 307 may calculate a score (weighted or non-weighted) for each safe driving behavior in the selected set of safe driving behaviors.

The safe driving points calculation unit 307 may apply a safe driving points equation to the number of safe driving points to provide to the user (block 514). In some examples, the safe driving points equation may aggregate the scores for each safe driving behavior in the selected set of safe driving behaviors. An example of a safe driving points equation may be:

$$\text{safe driving points} = \text{safe\_driving\_behavior}[1].\text{score} +$$

$$\text{safe\_driving\_behavior}[2].\text{score} + \ldots$$

$$+ \text{safe\_driving\_behavior}[n].\text{score}$$

where safe_driving_behavior[1].score ... safe_driving_behavior[n].score are the respective scores for each safe driving behavior in the selected set of safe driving behaviors. In some examples, the scores for each safe driving behavior may be weighted, as described above. Additionally or alternatively, the scores for each safe driving behavior may be weighted by the safe driving points equation. An example of a safe driving points equation with weights may be:

$$\text{safe driving points} = (\text{safe\_driving\_behavior}[1].\text{score} \times \text{weight}[1]) +$$

$$(\text{safe\_driving\_behavior}[2].\text{score} \times \text{weight}[2]) + \ldots$$

$$+ (\text{safe\_driving\_behavior}[n].\text{score} \times \text{weight}[n])$$

where weight[1] ... weight[n] are the weights respectively associated with safe_driving_behavior[1] ... safe_driving_behavior[n].

It will be appreciated that additional or alternative mathematical operations may be selectively employed to aggregate the scores for each safe driving behavior in the selected set of safe driving behaviors. It will also be appreciated that the safe driving points calculation unit 307 may be configured to employ one or more safe driving points equations that respectively aggregate different safe driving behaviors. For example, where an insurance company (e.g., Insurance Company A) maintains a set of safe driving behaviors (e.g., Safe Driving Behaviors A), the insurance company may also maintain a corresponding safe driving points equation (e.g., Safe Driving Points Equation A) to aggregate the scores associated with each safe driving behavior in Safe Driving Behaviors A.

In some embodiments, the safe driving points equation and/or account funds equation may include a penalty for unsafe driving behaviors. Thus, where the driving analysis results indicate that the user engages in unsafe driving behaviors, the safe driving points calculation unit 307 may deduct points accordingly. One or more sets of unsafe driving behaviors may be stored in the safe driving behaviors database 314, or in a different database (e.g., an unsafe driving behaviors database). The safe driving points calculation unit 307 may thus repeat steps 508-512 for the unsafe driving behaviors, such that the safe driving points calculation unit 307 calculates a score (weighted or non-weighted) for each unsafe driving behavior, and aggregates these scores to calculate a unsafe driving score penalty. The unsafe driving score penalty is subtracted from the aggregated safe driving behaviors scores in the safe driving points equation. As described in reference to safe driving behaviors, the unsafe driving behaviors may be stored as specified by different third-party systems. For example, one set of unsafe driving behaviors may be maintained for Insurance Company A, and another set of unsafe driving behaviors may be maintained for Insurance Company B. The various sets of unsafe driving behaviors may overlap.

The safe driving points calculation unit 307 may update the total number of safe driving points earned by the user based on the output of the safe driving points equation (block 516). The safe driving points calculation unit 307 may update the safe driving points database 316 to reflect an increased number of safe driving points for a particular user. In some examples, where the safe driving points database 318 contains a non-zero value amount of total safe driving points for a particular user, the safe driving points calculation unit 307 may increment this value by the output of the safe driving points equation, as calculated in block 506. The safe driving points calculation unit 307 may send the updated total number of safe driving points to the safe driving reward calculation unit 308 and/or the account funds calculation unit 306 (block 518). In certain embodiments, the account funds calculation unit 306 may convert safe driving points earned by a user directly into account funds (block 404) (e.g., without calculation and/or issuance of a reward based on safe driving points earned by the user). In some embodiments, the safe driving points calculation unit 307 may also send the updated total number of safe driving points to one or more third-parties (e.g., insurance companies) at a third-party system 244. In some embodiments, the safe driving points calculation unit 307 may be configured to limit the total number of safe driving points earned by the user over a period of time. For example, the safe driving points calculation unit 307 may be configured to allow no more than 1000 safe driving points per calendar year per user. In another example, the safe driving points calculation unit 307 may be configured to allow no more than 100,000 safe driving points per calendar year for all users. As such, in some examples, the safe driving points calculation unit 307 may increment the total number of safe driving points earned by the user by an amount less than the output of the safe driving points equation (block 516).

In an alternate embodiment, the safe driving points calculation unit 307 may calculate safe driving points for each set of driving behaviors in the safe driving behaviors database 314. For example, the safe driving points calculation unit 307 may calculate and maintain safe driving points for each third-party (e.g., insurance company). For example, after one trip, a user may earn 450 safe driving points based on safe driving behaviors for Insurance Company A, but the same user may earn 500 safe driving points based on safe driving behaviors for Insurance Company B. As such, the vehicle maintenance savings account evaluation system 202 may maintain the total safe driving points earned by a user from the perspective of each insurance company.

In some embodiments, the safe driving points calculation unit 307 may also calculate a number of safe driving points to provide to the user based on a user's interaction with the vehicle maintenance savings account evaluation system 202. For example, the safe driving points calculation unit 307 may provide safe driving points to a user for enrolling in the safe driving points program (e.g., creating a user account associated with the vehicle maintenance savings account evaluation system 202). In other examples, the safe driving points calculation unit 307 may provide safe driving points to a user for further engaging with the vehicle maintenance savings account evaluation system 202, such as, taking a survey, emailing a promotion code, or learning about safe driving (e.g., participating in a safe driving tutorial, watching a safe driving video, etc.).

Figure 6:
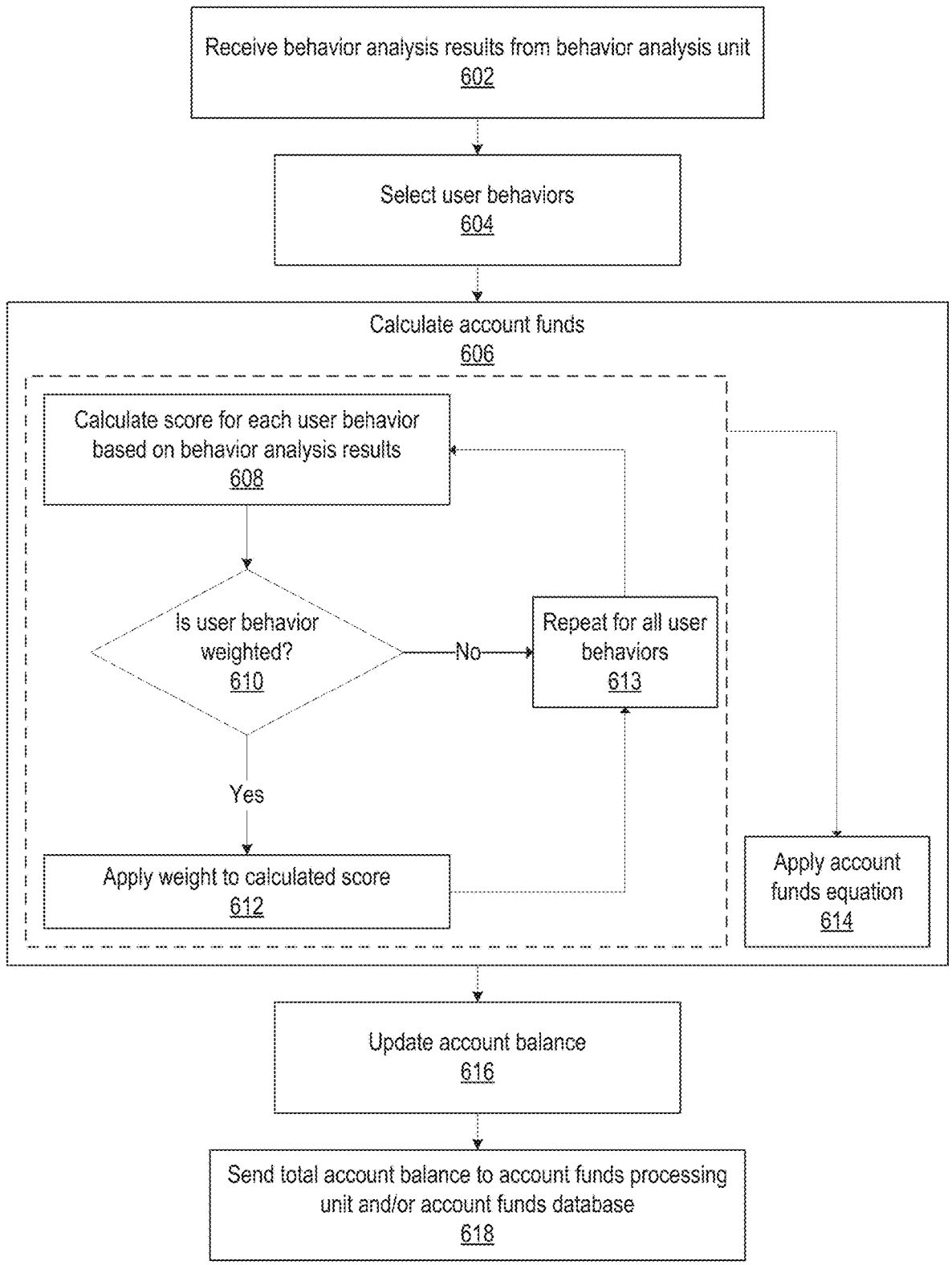
FIG. 6 is a flowchart of an example method of calculating and providing vehicle maintenance savings account funds according to one or more aspects of the disclosure.

Referring to FIG. 6, a flowchart of example method steps for calculating and providing account funds is shown. The account funds calculation unit 306 may be configured to calculate and provide account funds on-demand as user data is received and processed by the behavior analysis unit 302 (e.g., in real-time, at the end of each trip, etc.), or at regular intervals (e.g., daily, monthly, quarterly, annually, etc.). The account funds calculation unit 306 may receive the behavior analysis results from the behavior analysis unit 302 (block 602). The account funds calculation unit 306 may select a set of user behaviors upon which to base the total account funds provided to the user (block 604). The set of user behaviors comprise one or more safe driving behaviors defined in the safe driving behaviors database 314, one or more purchase behaviors defined in purchase behaviors database 315, and/or one or more account use behaviors defined in the account use database 316. In some embodiments, the set of user behaviors may include all of the user behaviors defined in the behaviors database 313. In other embodiments, the set of user behaviors may be a subset of the user behaviors defined in the behaviors database 313. For example, the set of user behaviors may be limited to user behaviors associated with one or more user behavior categories. In another example, the set of user behaviors may be limited to user behaviors associated with a particular insurance company. In yet another example, the set of user behaviors may be based on the behavior analysis results received. Thus, the set of user behaviors used to calculate and provide account funds may vary for users using the vehicle maintenance savings account acquisition system 100. Alternatively, a uniform set of user behaviors may be employed to calculate and provide account funds.

Based on the selected set of user behaviors, the account funds calculation unit 306 may calculate an amount of account funds to provide the user (block 606). For each user behavior in the selected set of user behaviors, the account funds calculation unit 306 may calculate a score based on the behavior analysis results (block 608). Specifically, the account funds calculation unit 306 may first determine whether the user behavior was exhibited in the behavior analysis results. For example, where the user behavior is based on maintaining a regular vehicle maintenance schedule, the account funds calculation unit 306 may determine whether the behavior analysis results for a particular time period reflected an average maintenance schedule by comparing an average maintenance schedule with the maintenance schedule maintained by the user during the particular time period. In some examples, the behavior analysis results may include overall trip metrics (e.g., minimum/maximum/average speed, number of hard brakes, total miles traveled, etc.), such that the account funds calculation unit 306 may compare the metrics to the requirements of a safe driving behavior. However, in other examples, the account funds calculation unit 306 may need to derive one or more trip metrics in order to make a determination as to whether a driver engaged in a safe driving behavior. For example, where a safe driving behavior involves two or more conditions (e.g., maintaining an average speed at least 10 mph below the speed limit while driving in rain), the account funds calculation unit 306 may create a subset of behavior (e.g., driving) analysis results corresponding to periods of rain, and compute an average speed for the subset of behavior (e.g., driving) analysis results.

Where the account funds calculation unit 306 determines that the user engaged in a certain behavior based on the behavior analysis results, the account funds calculation unit 306 may use the numerical value associated with the user behavior in the behaviors database 313 as the score of the particular user behavior. The account funds calculation unit 306 may adjust the score of the user behavior based on a weight assigned to the user behavior in the behaviors database 313 (block 610). Where the user behavior is assigned a weight, the account funds calculation unit 306 may combine the score of the user behavior with the weight of the user behavior (e.g., by multiplying the weight and the numerical value) (block 612). Additionally or alternatively, the account funds calculation unit 306 may use the weight assigned to the user behavior category associated with the user behavior in the user behaviors database 313 to adjust the score of the user behavior.

The account funds calculation unit 306 may repeat these method steps (blocks 608, 610, and 612) for all user behaviors in the selected set of user behaviors. As such, the account funds calculation unit 306 may calculate a score (weighted or non-weighted) for each user behavior in the selected set of user behaviors.

The account funds calculation unit 306 may apply an account funds equation to calculate the amount of account funds to provide to the user (block 614). In some examples, the account funds equation may aggregate the scores for each user behavior in the selected set of user behaviors. An example of an account funds equation may be:

account funds=user_designation[1]+ user_behavior[1].score+ user_behavior[2].score+ . . .

+user_behavior[$n$].score where user_behavior[1].score . . . user_behavior[$n$].score are the respective scores for each user behavior in the selected set of user behaviors and user_designation[1] is the amount of funds deposited by the user. In some examples, the scores for each user behavior may be weighted, as described above. Additionally or alternatively, the scores for each user behavior may be weighted by the account funds equation. An example of an account funds equation with weights may be:

account funds=user_designation[1]+

(user_behavior[1].score×weight[1])+

(user_behavior[2].score×weight[2])+ . . .

+(user_behavior[$n$].score×weight[$n$])

where weight[1] . . . weight[$n$] are the weights (e.g., Superdollars) respectively associated with user_behavior[1].score . . . user_behavior[$n$].score.

It will be appreciated that additional or alternative mathematical operations may be selectively employed to aggregate the scores for each user behavior in the selected set of user behaviors. According to various embodiments the account manager may deposit an amount of funds (e.g., money, money proxy, Superdollars, etc.) or percentage of a purchase price into the vehicle maintenance savings account based on, for example, the amount or percentage specified by the account funds use database 320 and/or the behaviors database 313. In some examples, a particular user behavior (e.g., purchase of a particular product/service, use of a particular merchant/service provider, a particular account use, etc.) may earn a user a set amount of funds (e.g., $5 for referring a user that is not a customer of the account manager, $10 for an oil change at a particular service provider, $15 for a tire rotation, 3% of the purchase price for new brakes, etc.) or a particular Superdollar multiplier (e.g., 120% of a dollar if the user drives with passengers, 20% of a dollar for being a passenger in a carpool, 150% of a dollar if the user purchases original safety equipment, 50% of a dollar if the user uses the vehicle maintenance savings account to pay for any costs of maintaining and/or operating a particular type of vehicle (e.g., a hybrid vehicle), etc.). In certain examples, the vehicle maintenance savings account earns funds continuously (e.g., a certain amount of funds per month/week/year and/or per mile, etc.) in the absence of certain undesirable user behaviors. For instance, the vehicle maintenance savings account balance could increase by $0.40/mile in the absence of a car accident or other undesirable user behavior. In some instances, the vehicle maintenance savings account balance could increase by a certain amount of funds per gallon of gas purchased at a particular fuel station. It will also be appreciated that the account funds calculation unit 306 may be configured to employ one or more account funds equations that respectively aggregate different user behaviors. For example, where an insurance company (e.g., Insurance Company A) maintains a set of user behaviors (e.g., Safe Driving Behaviors A, Purchase Behaviors A and Account Use Behaviors A), the insurance company may also maintain a corresponding account funds equation (e.g., Account Funds Equation A) to aggregate the scores associated with each user behavior in Safe Driving Behaviors A, Purchase Behaviors A and/or Account Use Behaviors A.

In some embodiments, the account funds equation may include a penalty for certain undesirable behaviors (e.g., unsafe driving behaviors). Thus, where the behavior analysis results indicates that the user engages in undesirable behaviors (e.g., unsafe driving behaviors), the account funds calculation unit 306 may deduct funds accordingly. In various embodiments, user designated/deposited funds may not be deducted if the user engages in undesirable behaviors. Rather, Superdollars, interest, money-proxy and the like may be deducted if the user engages in undesirable behaviors. In other embodiments, if the user engages in undesirable behaviors the weight may be reduced (e.g., by half, to zero, etc.) for a particular period of time (e.g., days, weeks, months, indefinitely, etc.). In certain embodiments, the user will receive a notification that a particular penalty will apply if the user engages in any more or a particular number of undesirable behaviors. One or more sets of undesirable user behaviors may be stored in the behaviors database 313, or in a different database (e.g., an undesirable user behaviors database). The account funds calculation unit 306 may thus repeat steps 608-612 for the undesirable user behaviors, such that the account funds calculation unit 306 calculates a score (weighted or non-weighted) for each undesirable user behavior, and aggregates these scores to calculate an undesirable user behavior score penalty. The undesirable user behavior score penalty is subtracted from the aggregated user behaviors score in the account funds equation. As described in reference to safe driving behaviors, the undesirable user behaviors may be stored as specified by different third-party systems. For example, one set of undesirable user behaviors may be maintained for Insurance Company A, and another set of undesirable user behaviors may be maintained for Insurance Company B. The various sets of undesirable user behaviors may overlap.

The account funds calculation unit 306 may update the total account funds deposited, earned and/or accumulated by the user based on the output of the account funds equation (block 616). The account funds calculation unit 306 may update the account funds database 317 to reflect an increased amount of funds for a particular user. In some examples, where the account funds database 317 contains a non-zero value amount of account funds for a particular user, the account funds calculation unit 306 may increment this value by the output of the account funds equation, as calculated in block 606. The account funds calculation unit 306 may send the updated account balance to the account funds processing unit 309 (block 618). In some embodiments, the account funds calculation unit 306 may also send the updated account balance to one or more third parties (e.g., insurance companies) at a third-party system 244. In some embodiments, the account funds calculation unit 306 may be configured to limit the total amount of funds or a certain type of funds (e.g., Superdollars, money-proxy, etc.) earned by the user over a period of time. For example, the account funds calculation unit 306 may be configured to allow no more than 1000 Superdollars per calendar year per user. In another example, the account funds calculation unit 306 may be configured to allow no more than 100,000 Superdollars per calendar year for all users. As such, in some examples, the account funds calculation unit 306 may increment the total amount of funds or a certain type of funds (e.g., Superdollars, money-proxy, etc.) earned by the user by an amount less than the output of the account funds equation (block 616).

In an alternate embodiment, the account funds calculation unit 306 may calculate account funds for each set of user behaviors in the behaviors database 313. For example, the account funds calculation unit 306 may calculate and maintain account funds for each third-party (e.g., insurance company). For example, after one trip, a user may earn 450 Superdollars based on user behaviors for Insurance Company A, but the same user may earn 500 Superdollars based on user behaviors for Insurance Company B. As such, the vehicle maintenance savings account evaluation system 202 may maintain the total account balance earned by a user from the perspective of each third-party (e.g., insurance company).

In some embodiments, the account funds calculation unit 306 may also calculate an amount of funds to provide to the user based on a user's interaction with the vehicle maintenance savings account evaluation system 202. For example, the account funds calculation unit 306 may provide account funds to a user for enrolling in a safe driving points program (e.g., creating a user account associated with the vehicle maintenance savings account evaluation system 202), enrolling in a vehicle maintenance savings account program (e.g., creating a user account associated with the vehicle maintenance savings account evaluation system 202), enrolling in a vehicle telematics program (e.g., creating a user account associated with the vehicle maintenance savings account evaluation system 202) and/or enrolling in a fuel rewards program (e.g., creating a user account associated with the vehicle maintenance savings account evaluation system 202). In other examples, the account funds calculation unit 306 may provide account funds to a user for further engaging with the vehicle maintenance savings account evaluation system 202, such as, taking a survey, emailing a promotion code, or learning about safe driving (e.g., participating in a safe driving tutorial, watching a safe driving video, etc.).

Figure 7:
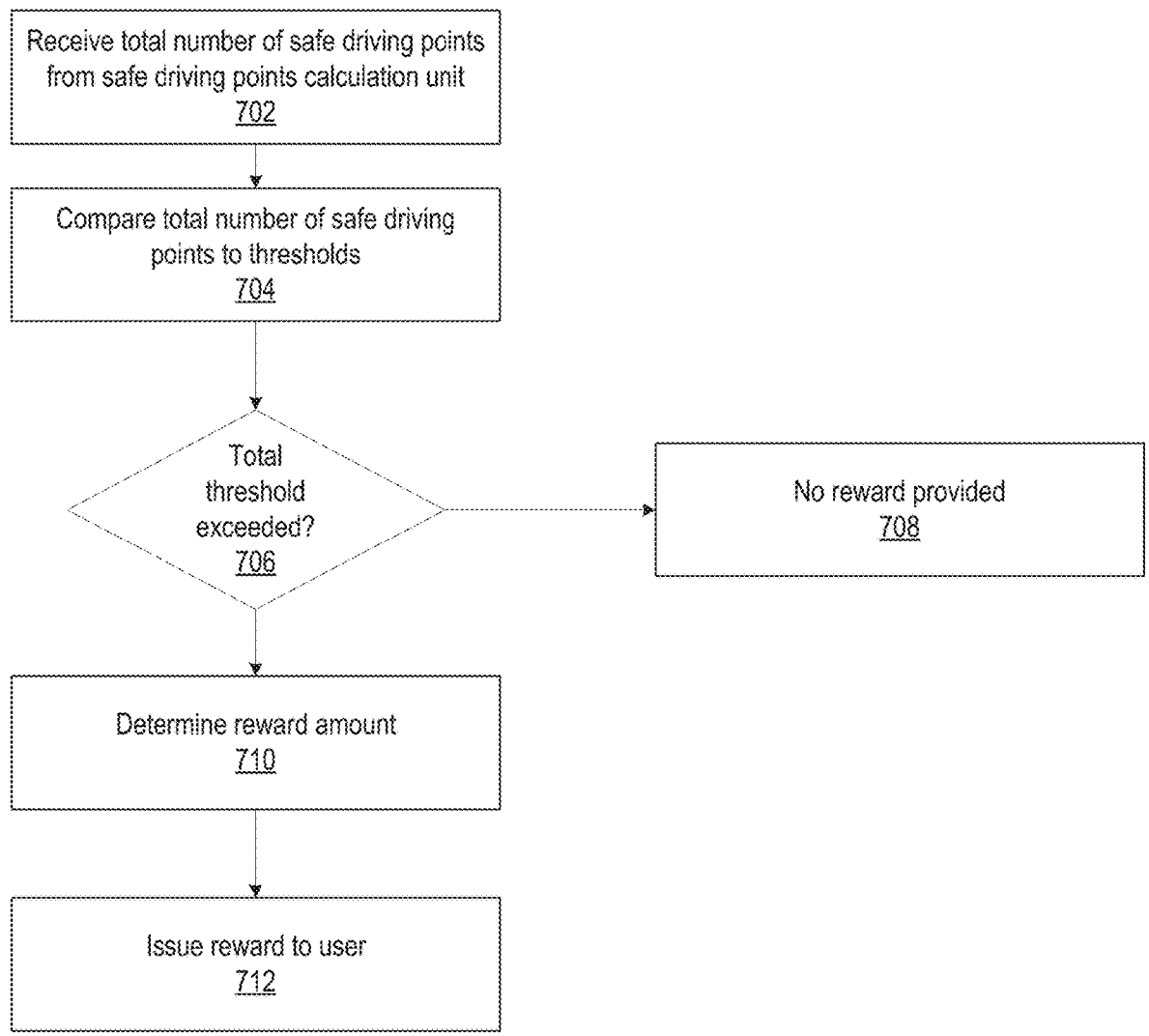
FIG. 7 is a flowchart of an example method of determining a safe driving reward based on safe driving points according to one or more aspects of the disclosure.

Referring now to FIG. 7, a flowchart of example method steps for determining a safe driving reward based on safe driving points is shown. The safe driving reward calculation unit 308 may receive a number of safe driving points earned by a user to determine whether or not to issue a safe driving reward, and if so, to determine the amount of the safe driving reward. For example, the safe driving reward calculation unit 308 may receive a total of safe driving points earned by a user from the safe driving points calculation unit 307 (block 702).

The safe driving reward calculation unit 308 may compare the total safe driving points to one or more reward thresholds (block 704). Where the user does not meet or exceed at least one rewards threshold, the safe driving reward calculation unit 308 may determine not to issue a safe driving reward (block 708). If the total safe driving points exceeds at least one rewards threshold, the safe driving reward calculation unit 308 may determine to provide a safe driving reward. In some embodiments, the safe driving reward calculation unit 308 may define one reward threshold (e.g., 500 safe driving points), whereby users with total safe driving points at or above the reward threshold receive rewards. In other embodiments, the safe driving reward calculation unit 308 may define more than one reward threshold (e.g., 500 safe driving points, 1000 safe driving points, 2000 safe driving points, etc.), so as to create a tiered system of rewards. In such examples, the safe driving reward calculation unit 308 may reward a user having between 500 and 999 total safe driving points differently from a user having 1000 safe driving points or more. For example, the safe driving reward calculation unit 308 may issue a fewer number of rewards to a user having between 500 and 999 total safe driving points as compared to a user having 1000 safe driving points or more. Additionally or alternatively, the safe driving reward calculation unit 308 may issue rewards of a higher amount for a user having 1000 safe driving points or more as compared to a user having between 500 and 1000 safe driving points. In some examples, the safe driving reward calculation unit 308 may use a uniform set of reward thresholds for all users. In other examples, the safe driving reward calculation unit 308 may use reward thresholds as specified by different third-parties (e.g., insurance companies). For example, the safe driving reward calculation unit 308 may use one set of reward thresholds for Insurance Company A (e.g., 100 safe driving points, 200 safe driving points, 300 safe driving points, etc.), and another set of reward thresholds for Insurance Company B (e.g., 500 safe driving points, 1000 safe driving points, 2000 safe driving points, etc.). In some examples, the sets of reward thresholds defined for the various third-parties (e.g., insurance companies) may overlap.

The safe driving reward may be a discount on goods and/or services available at a physical or online store. In other examples, the safe driving reward may be a discount on vehicular services, such as gas, towing services, vehicle maintenance, vehicle repair shops, roadside assistance, and so forth. Types of discounts may include, but are not limited to, a deduction of a dollar amount from a price of a product/service, a deduction of a dollar amount from an entire order, a deduction of a percentage from a price of a product/service, a deduction of a percentage from an entire order, etc.). In some examples, a safe driving reward may include a free ancillary product/service (e.g., free item from convenience store, free oil change, etc.). In yet other examples, the safe driving reward may be used to obtain fixed/guaranteed prices for gas, regardless of the current gas price. In such examples, the user may redeem gas at fixed/guaranteed prices for a predetermined period of time or indefinitely. As such, the safe driving reward may represent a cap on fuel prices for a predetermined period of time or indefinitely.

Where safe driving reward calculation unit 308 determines to provide a safe driving reward, the safe driving reward calculation unit 308 may determine a reward amount (block 710). In some examples, the amount of the safe driver reward may be uniform regardless of the total safe driving points (i.e., the exceeded rewards threshold). For instance, a user having total safe driving points greater than a first rewards threshold may receive the same safe driving reward as a user having total safe driving points greater than a second rewards threshold, where the first rewards threshold is lower than the second rewards threshold. Thus, a user having total safe driving points greater than a second rewards threshold may have previously received the same driving award for exceeding the first rewards threshold. In other examples, the amount of the safe driver reward may be based on the total safe driving points (i.e., the exceeded rewards threshold). For instance, a user having a total safe driving points greater than a first rewards threshold may receive a safe driving reward of a lower amount than a user having total safe driving points greater than a second rewards threshold. For embodiments where the safe driving reward is a fixed price on gas, the fixed price may, in some examples, be the same for all rewards thresholds, and in other examples, may vary for each rewards thresholds.

Figure 10A:
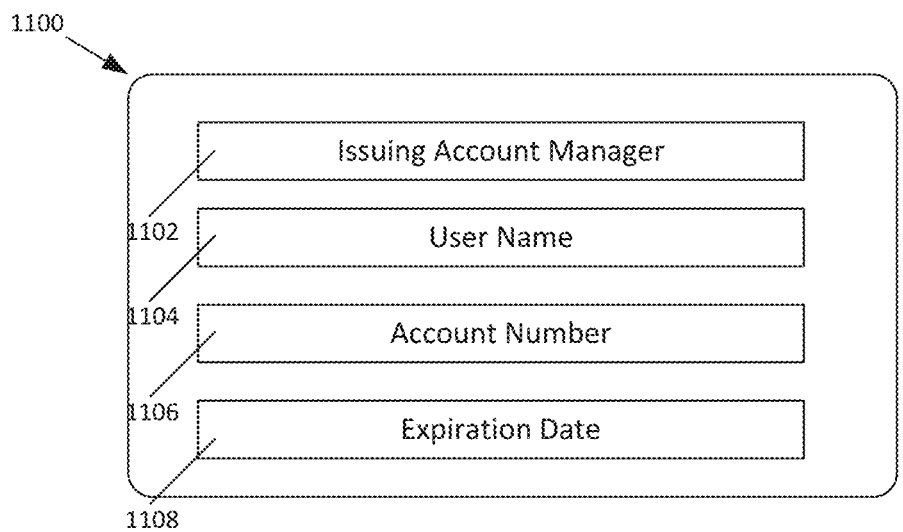
FIGS. 10A and 10B illustrate a vehicle maintenance savings account card according to one or more aspects of the disclosure.
Figure 10B:
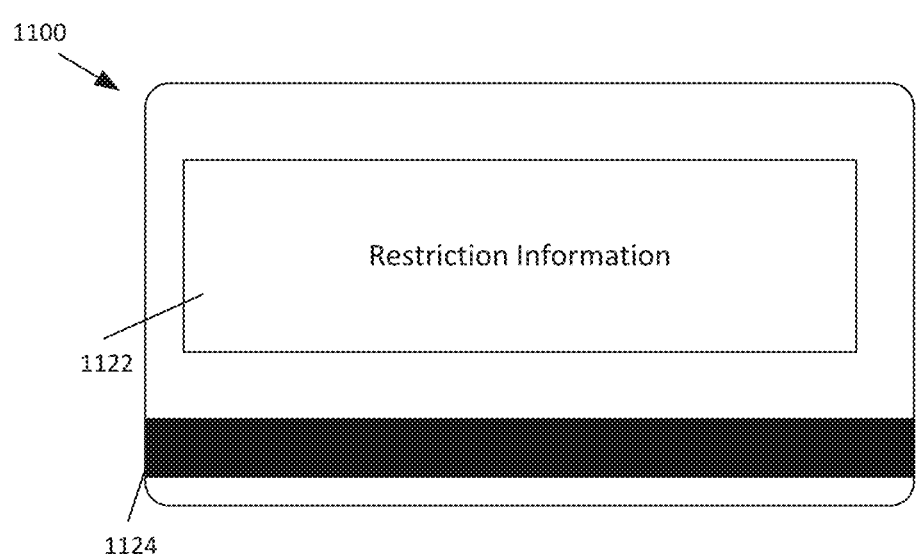

The safe driving reward calculation unit 308 may issue a safe driving reward to a user (block 712). The amount of the safe driving reward may correspond to the reward amount determined in block 710. The issued safe driving award may be stored in the safe driving rewards database 319. As described earlier, the safe driving reward may be represented in various formats, such as a coupon code, a QR code, a barcode, account code, and so forth. The safe driving award may be marked as Unused, until it is redeemed by the user. The safe driving reward calculation unit 308 may also specify terms and conditions of use/redemption of a safe driving reward. For example, the safe driving reward calculation unit 308 may restrict the usage of the safe driving reward by limiting the number of times it may be redeemed (e.g., safe driving reward may be redeemed an unlimited number of times, safe driving reward may only be redeemed once per user, safe driving reward may be redeemed only one by any user, safe driving reward may not be redeemed along with other rewards/coupons, etc.). The safe driving reward calculation unit 308 may also restrict the safe driving reward such that it is only redeemable for certain products and/or services, or at certain vehicle service centers. The safe driving reward calculation unit 308 may also restrict the duration that the safe driving reward is valid by, for example, setting a begin date (drivers will not be able to redeem the safe driving reward prior to this date) and/or by setting an end date (users will not be able to redeem the safe driving reward after this date). It will be appreciated that the safe driving reward calculation unit 308 may be configured to other aspects of redeeming a safe driving reward. A user may view and redeem safe driving rewards through the mobile special-purpose computing device 212 (e.g., via a mobile application installed on the mobile special-purpose computing device 212), account card, key fob, or a combination thereof. FIG. 10 illustrates an exemplary account card 1100. As seen in FIG. 10A, in certain embodiments, the front of the card may include various account information, including the issuing account manager 1102, the user name 1104, the account number 1106 and the expiration date 1106. As seen in FIG. 10B, in certain embodiments, the back of the card may include a space 1122 where particular account restrictions (e.g, spending and/or transfer restrictions) may be listed. Such account restrictions may additionally or alternatively be stored in the magnetic strip 1124 of the card 1100. Various other account information may also be stored in the magnetic strip 1124 of the card 1100. For instance, at least a portion of the data store 311 may be contained in the magnetic strip 1124 of the card 1100.

Figure 8:
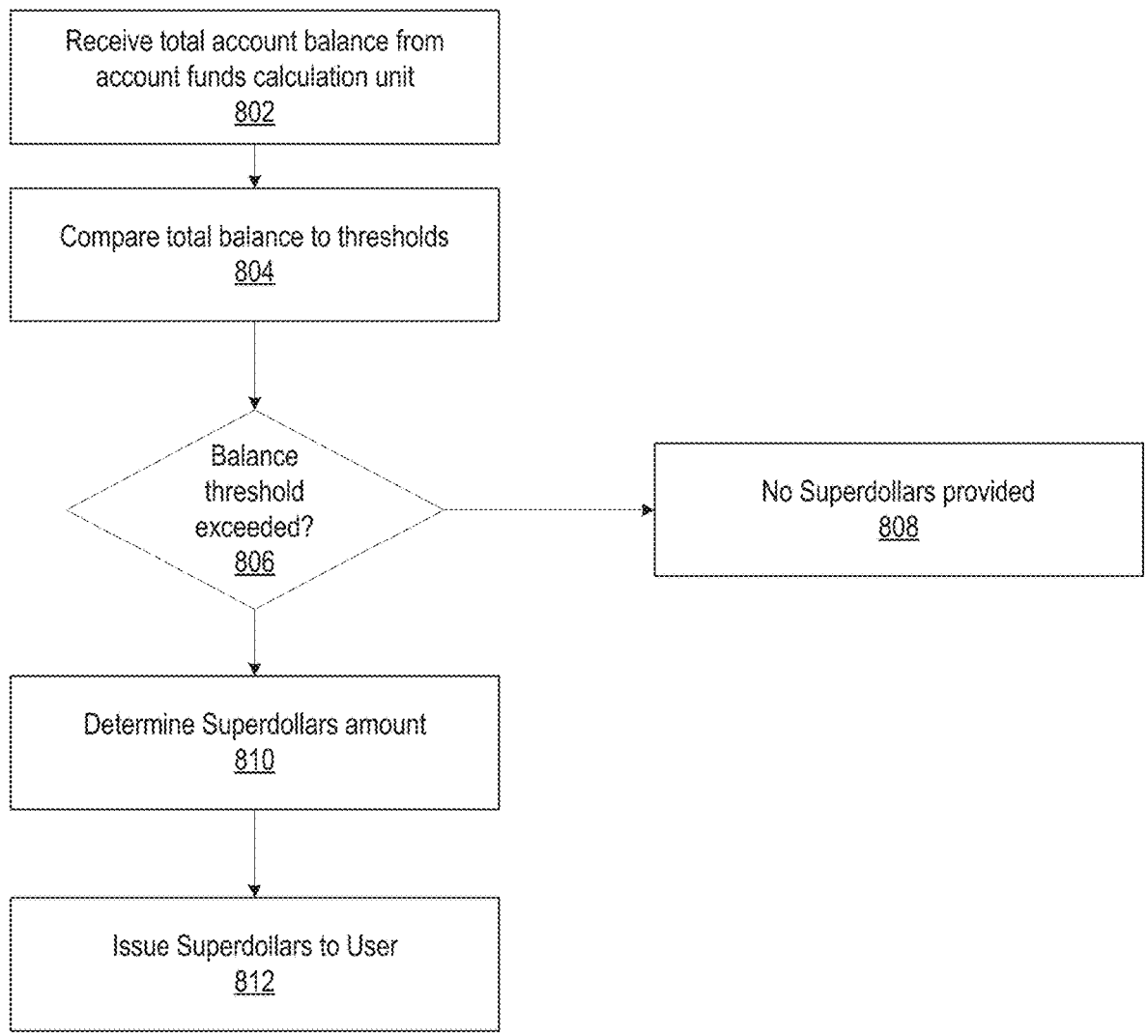
FIG. 8 is a flowchart of an example method of determining Superdollars based on vehicle maintenance savings account funds according to one or more aspects of the disclosure.

Referring now to FIG. 8, a flowchart of example method steps for determining Superdollars based on account funds is shown. The account funds processing unit 309 may receive a total account balance deposited, earned and/or accumulated by a user to determine whether or not to issue Superdollars, and if so, to determine the amount of Superdollars. For example, the account funds processing unit 309 may receive a total account balance deposited, earned and/or accumulated by a user from the account funds calculation unit 306 (block 802).

The account funds processing unit 309 may compare the total account balance to one or more balance thresholds (block 804). Where the user does not meet or exceed at least one balance threshold, the account funds processing unit 309 may determine not to issue Superdollars (block 808). If the total account balance exceeds at least one balance threshold, the account funds processing unit 309 may determine to provide Superdollars. In some embodiments, the account funds processing unit 309 may define one balance threshold (e.g., $500), whereby users with a total account balance at or above the balance threshold receive Superdollars. In other embodiments, the account funds processing unit 309 may define more than one balance threshold (e.g., $500, $1000, $2000, $5000, $10000, etc.), so as to create a tiered system. In such examples, the account funds processing unit 309 may reward a user having an account balance between $500 and $999 differently from a user having an account balance of $1000 or more. For example, the account funds processing unit 309 may issue a fewer number of Superdollars to a user having an account balance between $500 and $999 as compared to a user having an account balance of $1000 or more. Additionally or alternatively, the account funds processing unit 309 may issue Superdollars of a higher amount for a user having an account balance of $1000 or more as compared to a user having an account balance between $500 and $1000. In some examples, the account funds processing unit 309 may use a uniform set of account thresholds for all users. In other examples, the account funds processing unit 309 may use account thresholds as specified by different third-parties (e.g., insurance companies). For example, the account funds processing unit 309 may use one set of account thresholds for Insurance Company A (e.g., $100, $200, $300, etc.), and another set of account thresholds for Insurance Company B (e.g., $500, $1000, $2000, etc.). In some examples, the sets of account thresholds defined for the various third parties (e.g., insurance companies) may overlap.

The Superdollars may be redeemed for goods and/or services (e.g., gas, towing services, vehicle maintenance, vehicle repair shops, roadside assistance, and so forth) available at a physical and/or online store. In certain instances, if Superdollars are used to purchase goods and/or services, a discount may be applied. Types of discounts may include, but are not limited to, a deduction of a dollar amount from a price of a product/service, a deduction of a dollar amount from an entire order, a deduction of a percentage from a price of a product/service, a deduction of a percentage from an entire order, etc.). In some examples, redemption of Superdollars may result in a free ancillary product/service (e.g., free item from convenience store, free oil change, etc.). In yet other examples, the Superdollars may be used to obtain fixed/guaranteed prices for gas, regardless of the current gas price. In such examples, the user may redeem gas at fixed/guaranteed prices for a predetermined period of time or indefinitely. As such, the Superdollars may represent a cap on fuel prices for a predetermined period of time or indefinitely.

Where the account funds processing unit 309 determines to provide Superdollars, the account funds processing unit 309 may determine a Superdollars amount (block 810). In some examples, the amount of Superdollars may be uniform regardless of the account balance (e.g., the exceeded account threshold). For instance, a user having an account balance greater than a first account threshold may receive the same Superdollars as a user having an account balance greater than a second account threshold, where the first account threshold is lower than the second account threshold. Thus, a user having an account balance greater than a second account threshold may have previously received the same Superdollars for exceeding the first account threshold. In other examples, the amount of Superdollars may be based on the account balance (i.e., the exceeded account threshold). For instance, a user having an account balance greater than a first account threshold may receive Superdollars of a lower amount than a user having an account balance greater than a second account threshold. For embodiments where the Superdollars may be redeemed for a fixed price on gas, the fixed price may, in some examples, be the same for all account thresholds, and in other examples, may vary for each account threshold.

The account funds processing unit 309 may issue Superdollars to a user (block 812). The amount of Superdollars may correspond to the Superdollars amount determined in block 810. The issued Superdollars may be stored in the account funds database 317. As described earlier, Superdollars may be represented in various formats, such as money, a money-proxy, a coupon code, a QR code, a barcode, account code, and so forth. The Superdollars may be marked as Unused until redeemed by the user. The account funds processing unit 309 may also specify terms and conditions of use/redemption of Superdollars. For example, the account funds processing unit 309 may restrict the usage of Superdollars by limiting the number of times they may be redeemed (e.g., Superdollars may be redeemed an unlimited number of times, Superdollars may only be redeemed once per user, Superdollars may be redeemed only once by any user, Superdollars may not be redeemed along with other rewards/coupons, etc.). The account funds processing unit 309 may also restrict the Superdollars such that they may be only redeemable for certain products and/or services, or at certain vehicle service centers. account funds processing unit 309 may also restrict the duration that the Superdollars may be valid by, for example, setting a begin date (users will not be able to redeem the Superdollars prior to this date) and/or by setting an end date (users will not be able to redeem the Superdollars after this date). It will be appreciated that the account funds processing unit 309 may be configured to other aspects of redeeming Superdollars. A user may view and redeem Superdollars through the mobile special-purpose computing device 212 (e.g., via a mobile application installed on the mobile special-purpose computing device 212), account card 1100, key fob, or a combination thereof.

Figure 9:
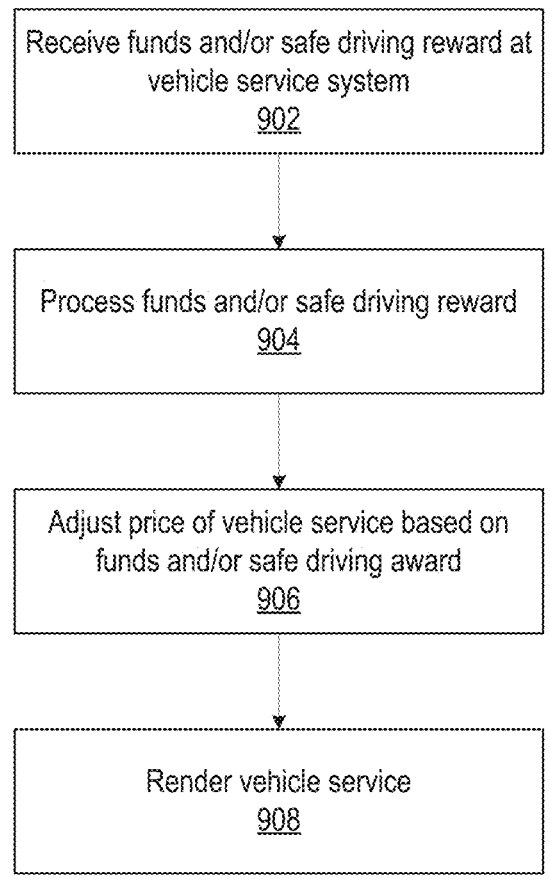
FIG. 9 is a flowchart of an example method of redeeming and processing vehicle maintenance savings account funds and/or a safe driving reward according to one or more aspects of the disclosure.

Referring now to FIG. 9, a flowchart of example method steps for redeeming and processing account funds and/or a safe driving reward is shown. The vehicle service system 242 may receive a safe driving reward and/or account funds as an input (block 902). In some examples, the user may present the safe driving reward and/or account funds to the vehicle service system 242 through a wireless network. In other examples, the user may present the safe driving reward and/or account funds to the vehicle service system 242 by interacting with an input device configured to operate in conjunction with the vehicle service system 242. For example, the user may present the present the safe driving reward and/or account funds to the vehicle service system 242 via a mobile special-purpose computing device 212. Additionally or alternatively, the user may present a printed version of the safe driving reward and/or account funds to the vehicle service system 242. The vehicle service system 242 may be equipped with one or more input devices to receive the safe driving reward and/or account funds from a user. For example, where the safe driving reward is represented as a QR code, the vehicle service system 242 may be equipped with a QR code scanner. Where the safe driving reward and/or account funds are represented as a barcode, the vehicle service system 242 may be equipped with a barcode scanner. Where the safe driving reward and/or account funds are represented as an alphanumeric coupon code, the vehicle service system 242 may be equipped with a keyboard, or similar device. Additionally or alternatively, the vehicle service system 242 may be equipped with an optical character recognition (OCR) device. It will be appreciated that the vehicle service system 242 may be equipped with additional or alternative input devices capable of receiving a safe driving reward and/or account funds from the user.

Upon receiving the safe driving reward and/or account funds, the vehicle service system 242 may process the safe driving reward and/or account funds (block 904). For example, the vehicle service system 242 may validate the safe driving reward and/or account funds based on its term and conditions, and/or other restrictions (e.g, spending and/or transfer restrictions particular to the vehicle maintenance savings account). For example, the vehicle service system 242 may validate whether the begin date of the safe driving reward is before the current date and/or the end date of the safe driving reward is after the current date. In another example, the vehicle service system 242 may verify that service to which the vehicle service system 242 is associated (e.g., gas station, vehicle maintenance, vehicle repair, roadside assistance, etc.) is not restricted by the safe driving reward and/or account funds. Further, the vehicle service system 242 may determine whether the safe driving reward and/or account funds has not reached its limit on the number of times it may be redeemed. As such, the vehicle service system 242 may be in communication with the vehicle maintenance savings account evaluation system 202 to determine a current status (e.g., Unused, Used, Expired), or a limit on the number of times the safe driving reward and/or account funds has been redeemed by a particular user.

Where the vehicle service system 242 determines that the redemption of a safe driving reward and/or account funds meets the specified terms and conditions or restrictions (e.g, spending and/or transfer restrictions particular to the vehicle maintenance savings account), the vehicle service system 242 may adjust the price of the product/service based on the discount specified by the safe driving reward and/or account funds (block 906). For example, where the safe driving reward and/or account funds specify deducting a dollar amount or percentage from the product, service, or order, the vehicle service system 242 may adjust the price of the product/service order to reflect the deduction. In another example, where the safe driving reward and/or account funds specify a fixed price of gas at a gas station, the vehicle service system may calculate the price of the product/service based on the specified fixed price, rather than the current market price. As such, a user may be able to secure fixed (i.e. lower) gas prices by engaging in safe driving behaviors. Further, where the safe driving reward and/or account funds may be used more than once by a user, a user may be able to obtain gas at a fixed price for an extended period of time. Additionally or alternatively, where the vehicle service system 242 determines that the redemption of a safe driving reward and/or account funds meets the specified terms and conditions or restrictions (e.g, spending and/or transfer restrictions particular to the vehicle maintenance savings account), the vehicle service system 242 may deposit a funds (e.g., money, money proxy, Superdollars, etc.) amount or percentage of the purchase price into the vehicle maintenance savings account based on, for example, the amount or percentage specified by the account funds use database 320 and/or the behaviors database 313.

The vehicle service system 242 may render the product/service, or instruct the service-providing machine (e.g., gas pump, vehicle repair facility, vehicle maintenance facility, roadside assistance system, towing service system, physical or online store, etc.) to render the product/service (block 808). For example, where the service providing machine is a gas pump, the vehicle service system 242 may instruct the gas pump to dispense a gas. In another example, where the service providing machine is a vehicle repair facility, the vehicle service system 242 may instruct the vehicle repair facility to perform a repair. In yet another example, where the service providing machine is a physical or online store, the vehicle service system 242 may instruct the special-purpose computing device associated with the store to dispense a product. In an alternate embodiment, the vehicle service system 242 may render the product/service prior to, contemporaneously with, or after adjusting the price of the product/service.

Figure 11:
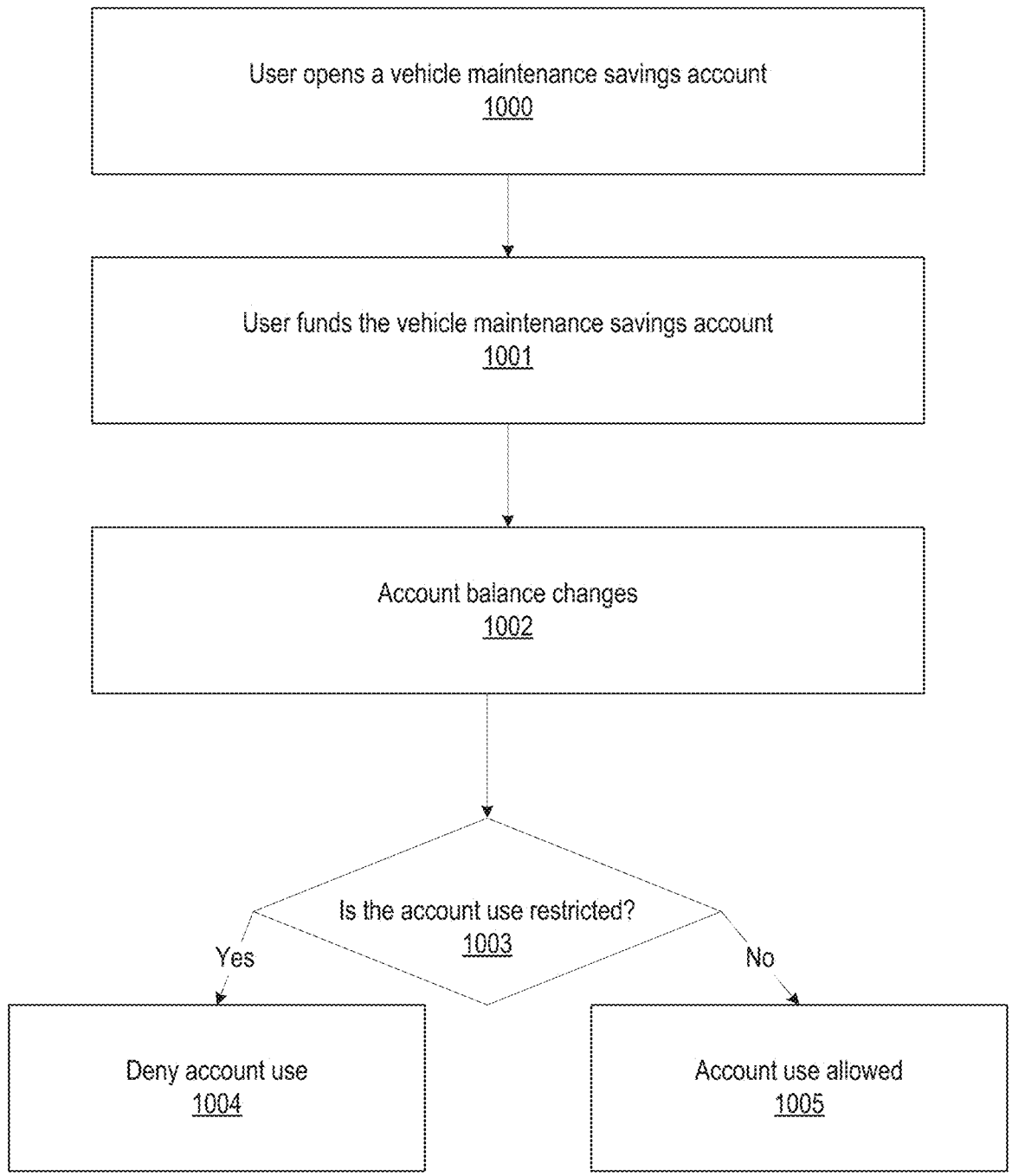
FIG. 11 is a flowchart of an example method of a user opening a vehicle maintenance savings account, depositing funds into the account and using the funds according to one or more aspects of the disclosure.

Referring now to FIG. 11, a flowchart of example steps for opening a vehicle maintenance savings account, depositing funds into the account and using the funds is shown. A user may open a vehicle maintenance savings account (block 1000) online, via a mobile application downloaded and/or running on a user mobile device, at a facility of the account manager, or the like. The account may be managed by an insurance company or an external non-insurance hosting entity (e.g., a bank, original equipment manufacturer (OEM), car dealership, etc.). The vehicle maintenance savings account evaluation system 202 may receive user information from the user (e.g., username and password, vehicle identification, mobile device identification, vehicle registration information, account beneficiary information, user name, age, contact information, social media account identification information, bank account information, credit card information, social security number, driver's license number, state identification number, passport number, driver score, etc.), and may store such information in the user information database 312. In some examples, the user information database 312 may also store the user's affiliation with one or more insurance companies. Upon opening the account, the user may be given a vehicle maintenance savings account number, which may be stored in the user information database 312.

A user may then deposit funds into the vehicle maintenance savings account (block 1001), where they will be saved for later use to pay for the costs of maintaining and/or operating a vehicle (e.g., costs of maintenance and operation associated with ownership, leasing or renting a vehicle) and/or driver safety. According to certain aspects, a user may pre-designate a monthly and/or periodic amount that will be withdrawn from a bank account of the user (e.g., checking and/or savings account, money market account, etc.) and placed into the vehicle maintenance savings account. In some aspects, such monthly and/or periodic amount is paid simultaneously with an insurance premium payment and placed into the vehicle maintenance savings account. Additionally or alternatively, a user may elect to have a portion of a pay check or other regular deposit directed to the vehicle maintenance savings account. In certain aspects, the balance of the vehicle maintenance savings account includes pre-tax funds. As discussed above, the account funds database 317 may enable the vehicle maintenance savings account evaluation system 202 to maintain the amount of account funds deposited, earned and/or accumulated by a user.

In addition or in the alternative to user designations, the account balance may grow or increase via employer designations, insurance company designations, family/friend designations, and/or transfers from another user's vehicle maintenance savings account (block 1002). In certain embodiments, the account manager designates funds to the vehicle maintenance savings account based on certain user behavior (e.g., the user's use of safety programs, use of particular authorized, certified or preferred services, shops or providers, referral of friends/family, use of social media to recommend the vehicle maintenance savings account program, safe driving, accumulation of good driver rewards checks, use of safe driver/vehicle data mobile applications, purchase of particular insurance products, use of particular insurance programs/services, purchase of particular safety products, purchase of fuel at a particular station, participation in a rewards program of a particular fuel/oil station/company, carpooling, being a passenger (e.g., not driving), using public transportation, renewing insurance, using the vehicle maintenance savings account during a particular time period, joining a vehicle maintenance savings account funds pool, adding additional vehicles to the account, providing information regarding vehicle repair or maintenance even when a warranty covers the cost, participating in a program that allows for provider/service recommendations to be provided to the user, maintaining/meeting a regular schedule of maintenance, driving a certain number of miles, purchasing another type of insurance policy, using a program or mobile application to book vehicle repair and maintenance appointments, being claim free and accident free for a particular period of time, etc.). According to various embodiments the account manager may deposit an amount of funds (e.g., money, money proxy, Superdollars, etc.) or percentage of a purchase price into the vehicle maintenance savings account based on, for example, the amount or percentage specified by the account funds use database 320 and/or the behaviors database 313. Subject to any applicable regulations, users may be provided rebates and/or account funds for engaging in certain user behaviors, with the rebates being deposited in the vehicle maintenance savings account. According to various aspects, the account balance grows or increases via accumulation of interest. In certain aspects, the account balance may accumulate interest at a guaranteed interest rate above a prime interest rate (e.g., 3%, 5%, 7%, 10%, 15%, 20%, 25%, etc.). The account balance, including interest earned, may roll over annually. As discussed above, the account funds database 317 may enable the vehicle maintenance savings account evaluation system 202 to maintain the amount of account funds deposited, earned and/or accumulated by a user. The behaviors database 313, including for example, one or more of the safe driving behaviors database 314, purchase behaviors database 315 and account use behaviors database 316, may store information associated with the behaviors (e.g., safe driving behaviors, purchase behaviors, account use behaviors, etc.) required to earn account funds (e.g., balance-affecting behaviors/events).

The user may use the vehicle maintenance savings account funds to pay for the costs of maintaining and/or operating a vehicle (e.g., costs of maintenance and operation associated with ownership, leasing or renting a vehicle) and/or driver safety. In certain embodiments, the account funds use database 320 may enable the vehicle maintenance savings account evaluation system 202 to restrict use of the account funds to payment of the costs of maintaining and/or operating a vehicle and/or driver safety (block 1003). For instance, a balance of the account may be restricted to use for payment for driver's education, driver's safety courses, attention improvement/maintenance courses, visual acuity improvement/maintenance courses, vehicle maintenance, repair, inspections, registration, check-ups, replacement parts, emissions testing, government stickers, taxes, license plates, insurance premiums, insurance deductibles, safety products, sensors/monitors, disposal fees, new vehicles of a certain type, etc. According to various embodiments, the account funds use database 320 may enable the vehicle maintenance savings account evaluation system 202 to place restrictions (e.g, spending and/or transfer restrictions) on the use of account funds. The vehicle maintenance savings account evaluation system 202 may allow a user to spend and/or transfer account funds based on at least the information stored in the account funds use database 320, account funds database 317 and one or more of the behaviors database 313, safe driving behaviors database 314, purchase behaviors database 315, and account use behaviors database 316. The account funds use database 320 may, for instance, enable the vehicle maintenance savings account evaluation system 202 to restrict use of the account funds to purchases of particular products (e.g., certain safety products, vehicle parts, etc.), particular vendors and/or particular transfers (e.g., to a vehicle maintenance savings account funds pool). In some aspects, the balance of the account may be used to pay for tax-deductible costs of meeting certain safety and environmental standards. According to certain embodiments, the manager of the account is an insurance company, the user does not have an insurance policy with the insurance company, and the insurance company processes payments to the insurance company of the user using the vehicle maintenance savings account of the user. If the vehicle maintenance savings account evaluation system 202 determines that a particular account use is not restricted based on at least the information stored in the account funds use database 320, account funds database 317 and one or more of the behaviors database 313, safe driving behaviors database 314, purchase behaviors database 315, and account use behaviors database 316, the particular account use will be allowed (block 1005). On the other hand, if the vehicle maintenance savings account evaluation system 202 determines that a particular account use is restricted based on the information stored in the account funds use database 320, account funds database 317 and one or more of the behaviors database 313, safe driving behaviors database 314, purchase behaviors database 315, and account use behaviors database 316, the particular account use will be denied.

In certain aspects, the account may achieve a negative balance when used to pay for the costs of maintaining and/or operating a vehicle (e.g., costs of maintenance and operation associated with ownership, leasing or renting a vehicle) and/or driver safety, essentially allowing the manager of the account or entity hosting or facilitating the account to provide a loan to the user for costs of maintaining and/or operating a vehicle and driver safety. The vehicle maintenance savings account balance may then grow via the various avenues discussed herein, allowing the user to pay off the loan. In certain embodiments, the account manager or entity hosting or facilitating the account may first require a user to join a vehicle maintenance savings account funds pool and attempt to satisfy the particular payment before the account manager or entity hosting or facilitating the account will provide a loan to the user. In some embodiments, the account manager or entity hosting or facilitating the account may limit the ability of the account to achieve a negative balance based on user behavior. For instance, if a user repeatedly engages in undesirable user behaviors, the account manager or entity hosting or facilitating the account may not allow the user's vehicle maintenance savings account achieve a negative balance (e.g., indefinitely or for a particular period of time). Alternatively or additionally, the account manager or entity hosting or facilitating the account may limit the loan amount (e.g., to purchases less than $1,000, less than $500, etc.) and/or use (e.g., to a particular type of purchase and/or service, particular merchant and/or service provider, etc.). According to various embodiments, users may transfer funds directly to another user (and/or the vehicle maintenance savings account of another user) in need of funds for the costs of vehicle possession and/or driver safety and/or to a vehicle maintenance savings account funds pool (e.g., a separate vehicle maintenance savings account having some or all of the features of a vehicle maintenance savings account detailed herein which accumulates funds that may be used by any of the users participating in the funds pool to pay for the costs of vehicle possession and/or driver safety). For instance, User A may not have enough funds in his vehicle maintenance savings account to pay for a particular cost of vehicle possession and/or driver safety (e.g., new brakes, a tire rotation, etc.). In some examples, other users (e.g., User B and/or User C) may directly pay for User A's particular cost of vehicle possession and/or driver safety directly from their vehicle maintenance savings account. In other examples, User A may still use his vehicle maintenance savings account to pay for the cost, essentially allowing the manager of the account or entity hosting or facilitating the account to provide User A a loan for such cost. In further examples, Users A, B and C all join a vehicle maintenance savings account funds pool, each contributing funds to such, and User A may pay for User A's particular cost of vehicle possession and/or driver safety directly from their vehicle maintenance savings account funds pool. In yet other examples, other users (e.g., User B and/or User C) may transfer funds from their respective vehicle maintenance savings account(s) into User A's vehicle maintenance savings account, and User A may then pay for the cost using his vehicle maintenance savings account.

As described in this disclosure, the vehicle maintenance savings account evaluation system 202 encourages safe driving and vehicle maintenance by providing rewards and/or account funds for engaging in safe driving behaviors. In an effort to publicly recognize safe driving, the rewards and/or account funds may be provided to both insurance customers and non-insurance customers. In an example embodiment, a driver's driving performance, number of account funds, safe driving points and/or rewards earned may be communicated to one or more insurance companies. The insurance companies may subsequently use this information to provide additional rewards and benefits to insurance customers and/or non-insurance customers. It will be appreciated that the rewards and benefits offered by the vehicle maintenance savings account evaluation system 202 may be subject to any applicable regulations (e.g. insurance regulations). In some examples, the additional rewards and benefits may be associated with new or existing insurance policies. For example, the insurance companies may offer reduced premiums or deductibles on existing insurance policies (e.g., for family or friends of the driver), where such reductions may escalate as the driver earns more safe driving points or rewards. In another example, the insurance companies may guarantee insurance or terms (e.g., premiums or deductibles) of an insurance policy for non-insurance customers enrolled and/or participating in the vehicle maintenance savings account acquisition system 100. It will be appreciated that the collection of driving data for insurance and non-insurance customers may advantageously allow insurance companies to offer more accurate rates for new and existing customers.

The various embodiments are not to be limited in scope by the specific embodiments disclosed in the examples. While the disclosure has been described with respect to specific examples including presently illustrative modes of carrying out the disclosure, a person having ordinary skill in the art, after review of the entirety disclosed herein, will appreciate that there are numerous variations and permutations of the above-described systems, methods and techniques that fall within the spirit and scope of the disclosure.

Although certain system components are used to illustrate certain aspects, the various embodiments are suitable for accumulating and maintaining money in a vehicle maintenance savings account, using any of the system components disclosed herein. With the benefit of the present disclosure, one skilled in the art will recognize that various parameters may need to be adjusted to compensate for the use of a different system component.

Where systems are described herein as having, including, or comprising specific components, or where processes are described herein as having, including, or comprising specific process steps, it is contemplated that the systems of the various embodiments can also consist essentially of, or consist of, the recited components, and that the processes of the various embodiments also consist essentially of, or consist of, the recited process steps.

Where a range of values is provided, each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure. For example, a numerical range of "1 to 5" should be interpreted to include not only the explicitly recited values of 1 and 5, but also individual values and sub-ranges within the indicated range. Thus, included in this numerical range are individual values such as 2, 3, 4, etc. and sub-ranges such as from 1 to 3, from 2 to 4, from 3-5, etc. The listing of exemplary values or ranges is not a disclaimer of other values or ranges between and including the upper and lower limits of a given range.

It is noted that, as used herein and in the appended claims, the singular forms "a," "an," and "the" include plural references unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Each of the individual embodiments described and illustrated herein has discrete components and features which may be readily separated from or combined with the features of any of the other several embodiments without departing from the scope or spirit of the disclosure. Any recited method can be carried out in the order of events recited or in any other order which is logically possible.

What is claimed is:

1. A system comprising:
   at least one processor;
   an electronic communication interface in signal communication with an electronic communication network; and
   a memory storing computer-readable instructions, that when executed by the at least one processor, cause the system to:
   execute an application configured to detect telematics data by a telematics device in signal communication with the at least one processor and a plurality of sensors;
   initiate a communication session with the telematics device;
   receive, in real-time and via the communication session, the telematics data including data received from the plurality of sensors, the telematics data including a plurality of driving events, each driving event including at least two metrics based on at least one of: speed, acceleration, braking and turning;
   determine whether the at least two metrics match predefined criteria for a safe driving behavior;
   responsive to determining that the at least two metrics match predefined criteria for the safe driving behavior, identify an amount of funds to be added to a balance of funds in a vehicle maintenance savings account associated with a first user;
   cause the balance of funds in the vehicle maintenance savings account associated with the first user to be increased by the amount of funds to be added to the balance of funds;
   receive, at the electronic communication interface via the electronic communication network, a first electronic communication indicating that the amount of funds has been added to the balance of funds in the vehicle maintenance savings account associated with the first user;

receive, at the electronic communication interface via the electronic communication network, transaction data related to at least one transaction for the first user using at least a portion of the balance of funds in the vehicle maintenance savings account, wherein the transaction data includes a cost of the at least one transaction and an identification of what is being purchased; and cause, via the at least one processor, initiation of a payment of the cost of the at least one transaction using the funds in the vehicle maintenance savings account.

2. The system of claim 1, wherein the cost of the at least one transaction is a cost associated with courses or products selected from a group comprising of driver's education, driver's safety, attention improvement, attention maintenance, visual acuity improvement, visual acuity maintenance, and combinations thereof.

3. The system of claim 1, wherein the cost of the at least one transaction, with respect to a vehicle, is selected from a group comprising of: maintenance, repair, inspections, registration, check-ups, replacement parts, roadside assistance, emissions testing, government stickers, taxes, license plates, insurance premiums, insurance deductibles, safety products, sensors, monitors, disposal fees, replacements, and combinations thereof.

4. The system of claim 1, wherein the initiation of the payment causes the balance of funds in the vehicle maintenance savings account to become negative.

5. The system of claim 1, wherein the vehicle maintenance savings account is managed by an insurance company or an external non-insurance hosting entity.

6. The system of claim 1, wherein the vehicle maintenance savings account is managed by a first insurance company and the first user does not have an insurance policy with the first insurance company.

7. The system of claim 6, wherein:

the first user has an insurance policy with a second insurance company different from the first insurance company;

the at least one transaction comprises payment of an insurance premium or insurance deductible of the second insurance company; and the first insurance company, initiates payment, via the at least one processor, of the cost of the at least one transaction from the vehicle maintenance savings account to the second insurance company.

8. The system of claim 1, further including instructions that, when executed, cause the system to:

responsive to determining that the at least two metrics match predefined criteria for the safe driving behavior, determine that the safe driving behavior qualifies for a multiplier bonus, wherein identifying the amount of funds to be added to the balance of funds in the vehicle maintenance savings account associated with the first user includes multiplying the amount of funds to be added to the balance of funds by the multiplier bonus to identify an enhanced amount of funds, and wherein causing the balance of funds in the vehicle maintenance savings account associated with the first user to be increased by the amount of funds to be added to the balance of funds further includes increasing the balance of funds by the enhanced amount of funds.

9. The system of claim 1, wherein the at least one transaction comprises transfer of at least a portion of the balance of funds in the vehicle maintenance savings account to a vehicle maintenance savings account of a second user.

10. The system of claim 1, wherein the instructions, when executed by the at least one processor, further cause the system to:

access, via the electronic communication network, a set of balance-affecting events;

determine, via the at least one processor, whether or not the at least one transaction qualifies as at least one balance-affecting event based, at least in part, on a comparison, via the at least one processor, of the transaction data to the set of balance-affecting events;

responsive to a determination that the at least one transaction qualifies as the at least one balance-affecting event, calculate, via the at least one processor, a first balance increase amount to be applied to the balance of funds in the vehicle maintenance savings account; and increment, via the at least one processor, the balance of funds in the vehicle maintenance savings account by the first balance increase amount.

11. The system of claim 10, wherein the set of balance-affecting events comprises purchase of i) certified, preferred or authorized products; or ii) services from certified, preferred or authorized vendors, merchants or providers.

12. The system of claim 10, wherein the first balance increase amount is a percentage of the cost of the at least one transaction.

13. The system of claim 1, wherein causing, via the at least one processor, initiation of the payment of the cost of the at least one transaction using the funds in the vehicle maintenance savings account further includes generating a payment device including a scannable code.

14. The system of claim 13, wherein the scannable code is at least one of a bar code and a quick response (QR) code.

15. The system of claim 1, wherein the at least one transaction is a fuel purchase, and wherein causing, via the at least one processor, initiation of the payment of the cost of the at least one transaction using the funds in the vehicle maintenance savings account further includes transmitting an instruction to a fuel dispensing device to dispense fuel.

16. The system of claim 1, wherein identifying the amount of funds to be added to a balance of funds in a vehicle maintenance savings account associated with a first user further includes:

identifying a number of points associated with the safe driving behavior; and converting, based on a predetermined conversion rate, the number of points to the amount of funds.

17. One or more non-transitory computer-readable media storing computer executable instructions that, when executed by at least one processor, cause a computing device to:

execute an application configured to detect telematics data by a telematics device;

initiate a communication session with the telematics device;

receive, in real-time and via the communication session, the telematics data including data received from a plurality of vehicle sensors, the telematics data including a plurality of driving events, each driving event including at least two metrics based on at least one of: speed, acceleration, braking and turning;

determine whether the at least two metrics match predefined criteria for a safe driving behavior;

responsive to determining that the at least two metrics match predefined criteria for the safe driving behavior, identify an amount of funds to be added to a balance of funds in a vehicle maintenance savings account associated with a first user;

cause the balance of funds in the vehicle maintenance savings account associated with the first user to be increased by the amount of funds to be added to the balance of funds;

receive, at an electronic communication interface via an electronic communication network, a first electronic communication indicating that the amount of funds has been added to the balance of funds in the vehicle maintenance savings account associated with the first user;

receive, at the electronic communication interface via the electronic communication network, transaction data related to at least one transaction to be made by the first user using at least a portion of the balance of funds in the vehicle maintenance savings account, wherein the transaction data includes a cost associated with the at least one transaction and an identification of what is being purchased; and cause, via the at least one processor, initiation of a payment of the cost of the at least one transaction using the funds in the vehicle maintenance savings account.

18. The one or more non-transitory computer-readable media of claim 17, wherein the at least one transaction is a fuel purchase, and wherein causing, via the at least one processor, initiation of the payment of the cost of the at least one transaction using the funds in the vehicle maintenance savings account further includes transmitting an instruction to a fuel dispensing device to dispense fuel.

19. The one or more non-transitory computer-readable media of claim 17, further including instructions that, when executed, cause the computing device to:

responsive to determining that the at least two metrics match predefined criteria for the safe driving behavior, determine that the safe driving behavior qualifies for a multiplier bonus, wherein identifying the amount of funds to be added to the balance of funds in the vehicle maintenance savings account associated with the first user includes multiplying the amount of funds to be added to the balance of funds by the multiplier bonus to identify an enhanced amount of funds, and wherein causing the balance of funds in the vehicle maintenance savings account associated with the first user to increase by the amount of funds to be added to the balance of funds further includes increasing the balance of funds by the enhanced amount of funds.

20. A method, comprising:

executing, by a computing device including a memory and at least one processor, an application configured to detect telematics data by a telematics device;

initiating, by the at least one processor, a communication session with the telematics device;

receiving, in real-time and by the at least one processor via the communication session, the telematics data including data received from a plurality of vehicle sensors, the telematics data including a plurality of driving events, each driving event including at least two metrics based on at least one of: speed, acceleration, braking and turning;

determining, by the at least one processor, whether the at least two metrics match predefined criteria for a safe driving behavior;

responsive to determining that the at least two metrics match predefined criteria for the safe driving behavior, identifying, by the at least one processor, an amount of funds to be added to a balance of funds in a vehicle maintenance savings account associated with a first user;

causing, by the at least one processor, the balance of funds in the vehicle maintenance savings account associated with the first user to increase by the amount of funds to be added to the balance of funds;

receiving, by the at least one processor and at an electronic communication interface via an electronic communication network, a first electronic communication indicating that the amount of funds has been added to the balance of funds in the vehicle maintenance savings account associated with the first user;

receiving, by the at least one processor and at the electronic communication interface via the electronic communication network, transaction data related to at least one transaction to be made by the first user using at least a portion of the balance of funds in the vehicle maintenance savings account, wherein the transaction data includes a cost associated with the at least one transaction and an identification of what is being purchased; and causing, by the at least one processor, initiation of a payment, via the at least one processor, of the cost of the at least one transaction using the funds in the vehicle maintenance savings account.

* * * * *